United States Patent
Lull

(10) Patent No.: US 7,082,824 B2
(45) Date of Patent: *Aug. 1, 2006

(54) VARIABLE RESISTANCE SENSOR WITH COMMON REFERENCE LEG

(75) Inventor: John Michael Lull, Fullerton, CA (US)

(73) Assignee: Celerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/978,156

(22) Filed: Oct. 29, 2004

(65) Prior Publication Data

US 2005/0092077 A1    May 5, 2005

Related U.S. Application Data

(63) Continuation of application No. 10/622,004, filed on Jul. 16, 2003, now Pat. No. 6,845,659.

(60) Provisional application No. 60/436,207, filed on Dec. 23, 2002, provisional application No. 60/397,139, filed on Jul. 19, 2002.

(51) Int. Cl.
*G01F 1/68* (2006.01)

(52) U.S. Cl. .................................. 73/204.15

(58) Field of Classification Search ............... 73/202.5, 73/204.11, 204.15, 204.27; 702/45, 50; 324/415–6, 324/691, 693–5, 705–6
See application file for complete search history.

(56) References Cited

U.S. PATENT DOCUMENTS

| 4,672,997 A | 6/1987 | Landis et al. |
|---|---|---|
| 4,686,450 A | 8/1987 | Pichat |
| 4,815,280 A | 3/1989 | Tujimura et al. |
| 4,843,881 A | 7/1989 | Hubbard |
| 4,984,460 A | 1/1991 | Isoda |
| 5,062,446 A | 11/1991 | Anderson |
| 5,129,418 A | 7/1992 | Shimomura et al. |
| 5,141,021 A | 8/1992 | Shimomura et al. |
| 5,279,154 A | 1/1994 | Vavra et al. |
| 5,347,861 A | 9/1994 | Satoh |
| 5,394,755 A | 3/1995 | Sudo et al. |
| 5,410,912 A | 5/1995 | Suzuki |
| 5,441,076 A | 8/1995 | Moriya et al. |
| 5,461,913 A | 10/1995 | Hinkle et al. |
| 5,660,207 A | 8/1997 | Mudd |
| 5,684,245 A | 11/1997 | Hinkle |
| 5,693,880 A | 12/1997 | Maginnis, Jr. |

(Continued)

FOREIGN PATENT DOCUMENTS

EP    0 110 325 A1    6/1984

(Continued)

OTHER PUBLICATIONS

International Search Report mailed Nov. 25, 2003 in corresponding PCT Application PCT/US03/22337, filed Jul. 16, 2003.

*Primary Examiner*—Harshad Patel
(74) *Attorney, Agent, or Firm*—Lowrie, Lando & Anastasi, LLP

(57) ABSTRACT

A resistive bridge sensor circuit that includes a first resistive bridge circuit having a first variable resistance resistor and a second resistive bridge circuit having a second variable resistance resistor. The first and second resistive bridge circuits share at least a portion of a common reference leg that sets a resistance of a first and second variable resistors. The common reference leg or a portion of the common reference leg is alternately switchably connected to one of the first and second resistive bridge circuits.

21 Claims, 20 Drawing Sheets

U.S. PATENT DOCUMENTS

| | | |
|---|---|---|
| 5,711,342 A | 1/1998 | Kazama et al. |
| 5,741,968 A | 4/1998 | Arai |
| 5,765,283 A | 6/1998 | Mudd |
| 5,850,850 A | 12/1998 | Mudd |
| 5,865,205 A | 2/1999 | Wilmer |
| 5,911,238 A | 6/1999 | Bump et al. |
| 5,944,048 A | 8/1999 | Bump et al. |
| 6,044,701 A | 4/2000 | Doyle et al. |
| 6,216,726 B1 | 4/2001 | Brown et al. |
| 6,343,617 B1 | 2/2002 | Tinsley et al. |
| 6,404,612 B1 | 6/2002 | Pattantyus |
| 6,425,287 B1 | 7/2002 | Tominaga et al. |
| 6,446,504 B1 | 9/2002 | Maginnis, Jr. |
| 6,539,792 B1 | 4/2003 | Lull et al. |
| 6,575,027 B1 | 6/2003 | Larsen et al. |
| 6,595,049 B1 | 7/2003 | Maginnis, Jr. et al. |

FOREIGN PATENT DOCUMENTS

| | | |
|---|---|---|
| EP | 0 834 723 A1 | 4/1998 |
| WO | WO 01/04580 A2 | 1/2001 |
| WO | WO 01/04582 A1 | 1/2001 |
| WO | WO 01/04715 A1 | 1/2001 |
| WO | WO 01/04716 A1 | 1/2001 |
| WO | WO 01/04717 A1 | 1/2001 |
| WO | WO 01/04923 A1 | 1/2001 |
| WO | WO 01/61284 A | 8/2001 |

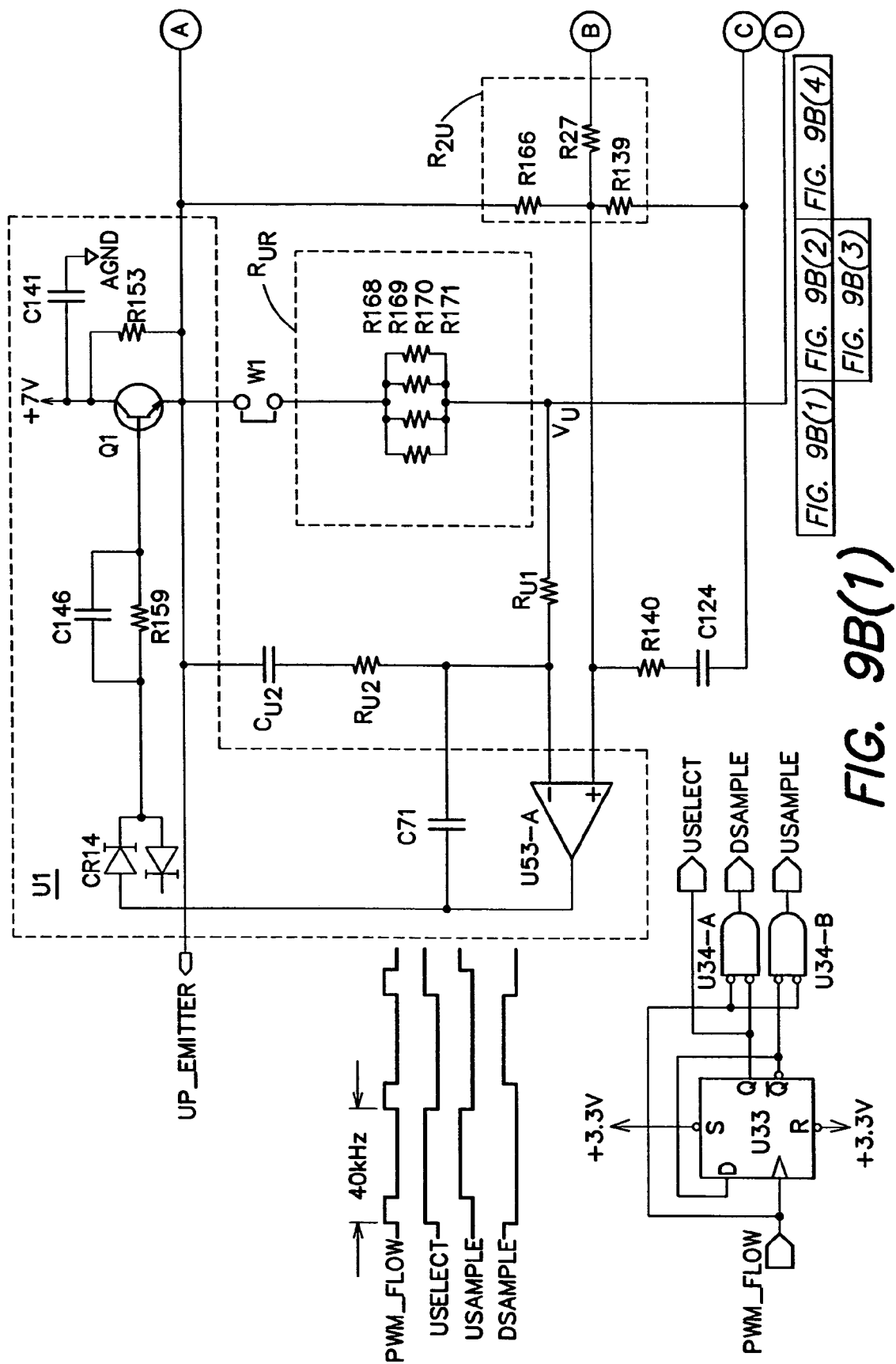
FIG. 9B(1)

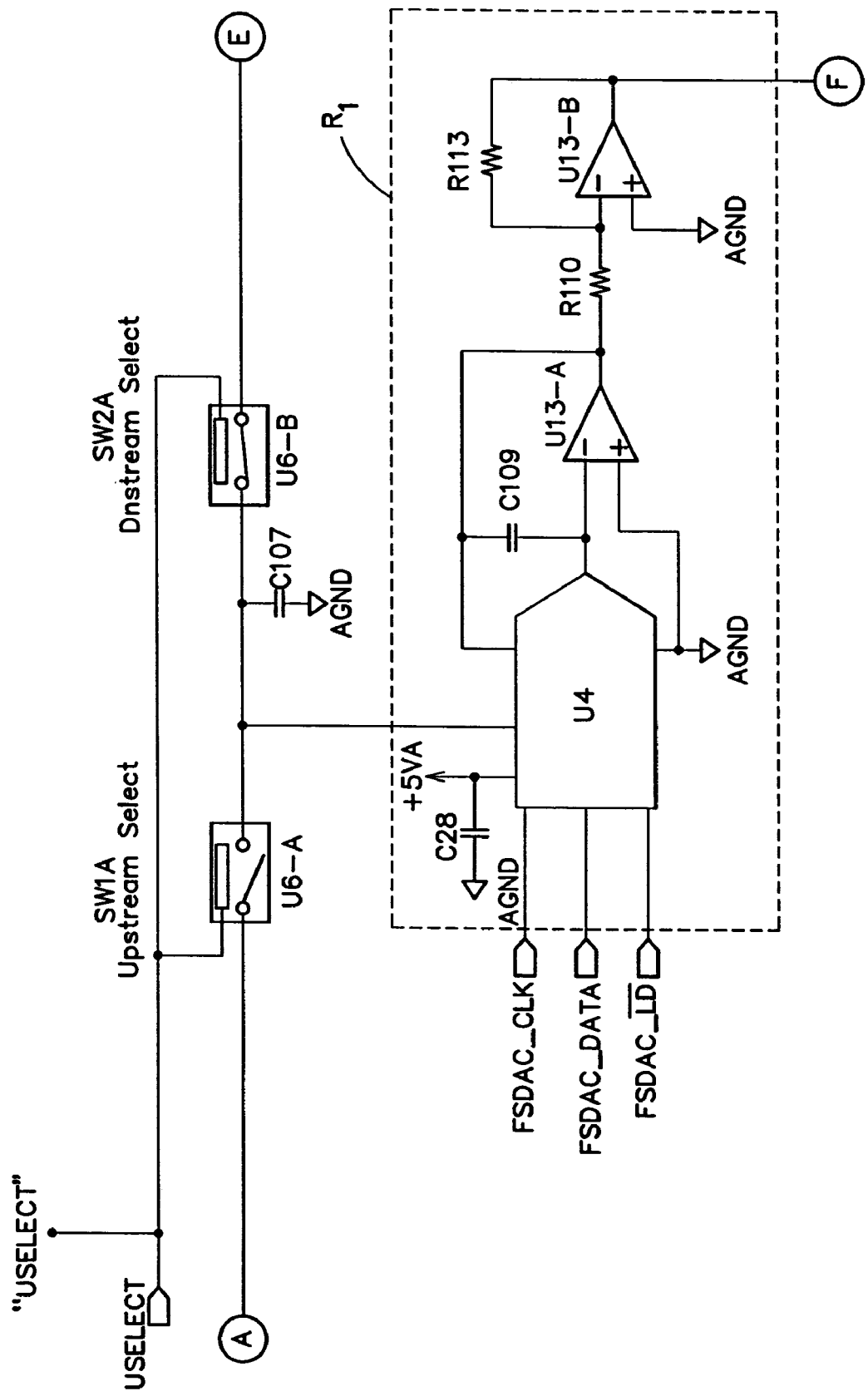
FIG. 9B(2)

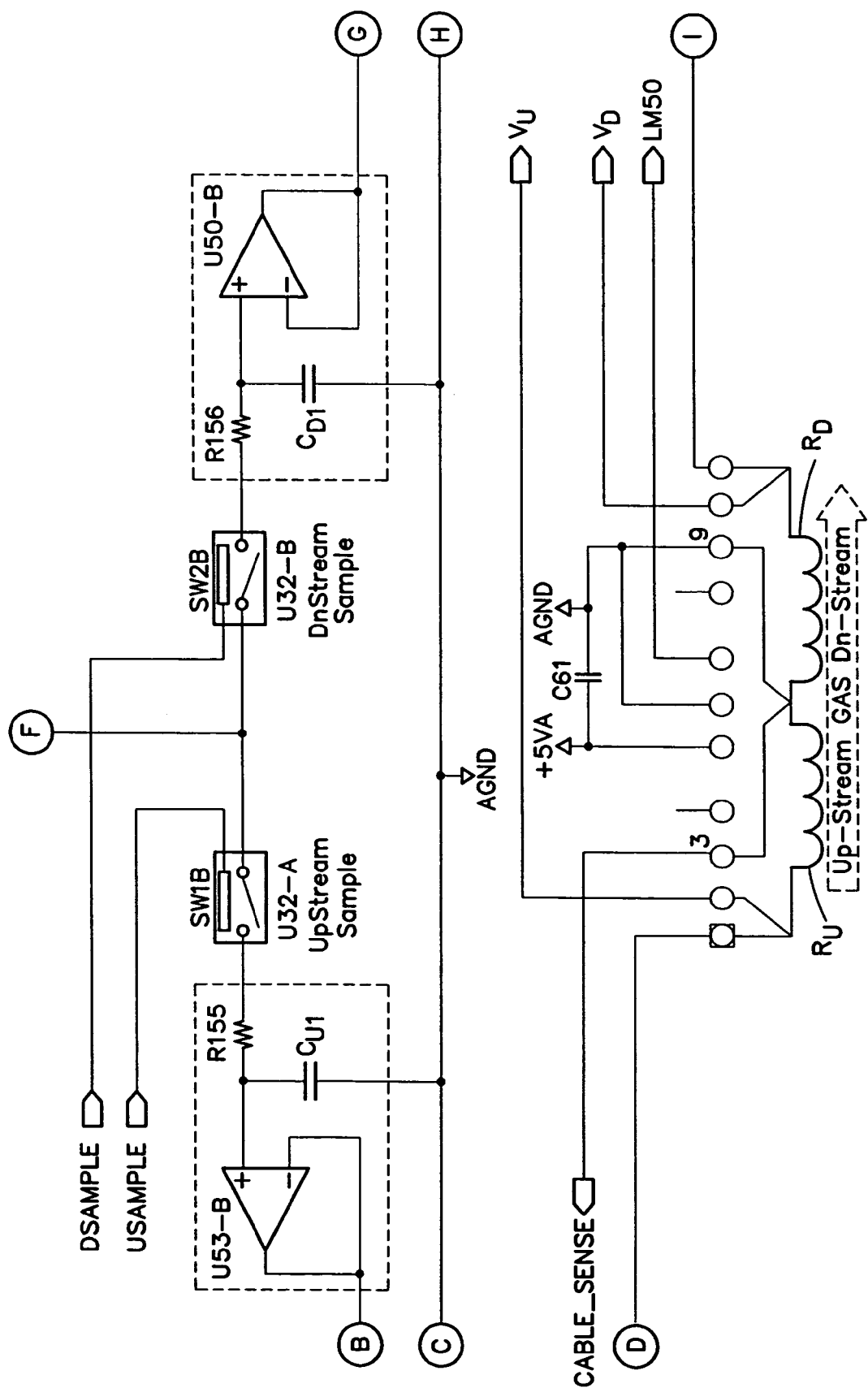
FIG. 9B(3)

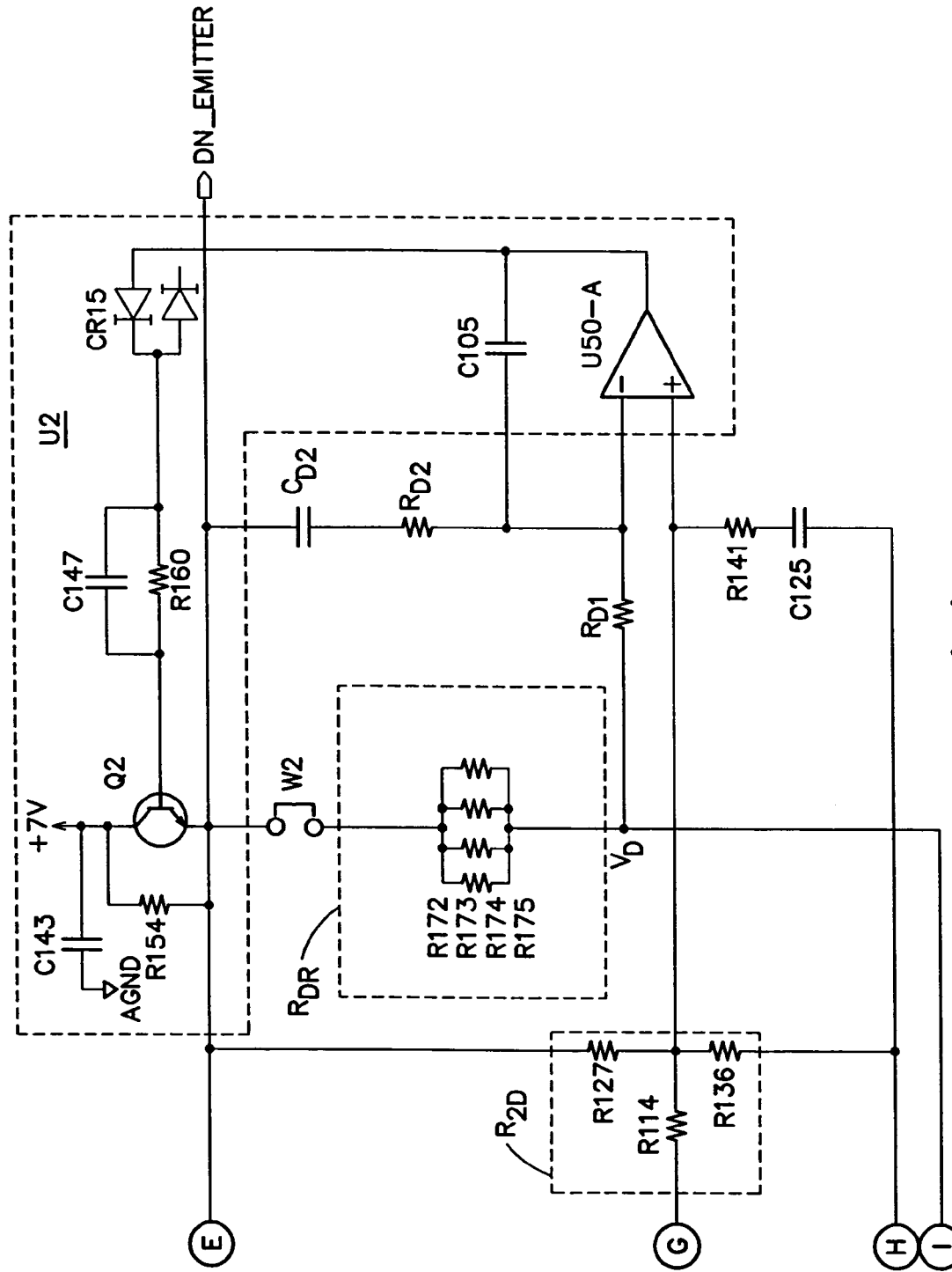
FIG. 9B(4)

VARIABLE RESISTANCE SENSOR WITH COMMON REFERENCE LEG

CROSS REFERENCE TO RELATED APPLICATIONS

This application is a continuation of U.S. patent application Ser. No. 10/622,004, filed Jul. 16, 2003 now U.S. Pat. No. 6,845,659, entitled "VARIABLE RESISTANCE SENSOR WITH COMMON REFERENCE LEG" by John Michael Lull, which is now allowed, and which claims the benefit of U.S. provisional application Ser. No. 60/436,207, filed Dec. 23, 2002, and U.S. provisional application Ser. No. 60/397,139, filed Jul. 19, 2002, each entitled VARIABLE RESISTANCE SENSOR WITH COMMON REFERENCE LEG, each of which are incorporated herein by reference in their entirety.

FIELD OF THE INVENTION

The present invention is directed to a resistive sensor, and more particularly to a mass flow sensor having separate upstream and downstream circuits that are capable of detecting the mass flow rate of a fluid and which share at least a portion of a common reference leg.

DESCRIPTION OF RELATED ART

Mass flow sensors are used in a wide variety of applications to measure the mass flow rate of a gas or other fluid. One application in which a mass flow sensor may be used is a mass flow controller. In a conventional mass flow controller, the mass flow rate of a fluid flowing in a main fluid flow path is regulated or controlled based upon a mass flow rate of a portion of the fluid that is diverted into a typically smaller conduit forming a part of the mass flow sensor. Assuming laminar flow in both the main flow path and the conduit of the sensor, the mass flow rate of the fluid flowing in the main flow path can be determined (and regulated or controlled) based upon the mass flow rate of the fluid flowing through the conduit of the sensor.

Two different types of mass flow sensors have traditionally been used, constant current mass flow sensors, and constant temperature mass flow sensors. An example of a constant current mass flow sensor is illustrated in FIG. 1. In FIG. 1, a fluid flows in a sensor pipe or conduit in the direction of the arrow X. Heating resistors or "coils" $R_1$ and $R_2$ having a large thermal coefficient of resistance are disposed about the sensor conduit on downstream and upstream portions of the sensor conduit, respectively, and are provided with a constant current I from a constant current source 901. As a result of the constant current I flowing through the coils $R_1$ and $R_2$, voltages $V_1$ and $V_2$ are developed across the coils. The difference between voltages $V_1$ and $V_2$ ($V_1-V_2$) is taken out of a differential amplifier 902, with the output of the amplifier 902 being proportional to the flow rate of the fluid through the sensor conduit.

At a zero flow rate, the circuit of FIG. 1 is configured so that the resistance value (and thus, the temperature) of coil $R_1$ is equal to the resistance value (and temperature) of coil $R_2$, and the output of the amplifier 902 is zero. As fluid flows in the sensor conduit, heat that is generated by coil $R_2$ and imparted to the fluid is carried towards $R_1$. As a result of this fluid flow, the temperature of coil $R_2$ decreases and that of coil $R_1$ increases. As the voltage dropped across each of these resistors is proportional to their temperature, voltage $V_1$ increases with an increased rate of fluid flow and voltage $V_2$ decreases, with the difference in voltage being proportional to the mass rate of flow of the fluid through the sensor conduit.

An advantage of a constant current mass flow sensor is that it can operate over a wide range of temperatures, is relatively simple in construction, and is responsive to changes in the ambient temperature of the fluid entering the sensor conduit. As the ambient temperature of the fluid entering the sensor conduit changes, so does the resistance of each of the coils $R_1$ and $R_2$. However, it takes a relatively long time for the temperature (and thus, the resistance) of the coils $R_1$ and $R_2$ to stabilize in response to a change in the rate of flow of the fluid.

The other type of mass flow sensor that is frequently used is a constant temperature mass flow sensor, examples of which are illustrated in FIGS. 2–4. As shown in the constant temperature mass flow sensor of FIG. 2, heating resistors or "coils" $R_{1A}$ and $R_{1B}$ are respectively disposed about the downstream and upstream portions of a sensor conduit through which a fluid flows in the direction of the arrow X. As in the constant current mass flow sensor of FIG. 1, each of the downstream and upstream coils $R_{1A}$ and $R_{1B}$ has a large thermal coefficient of resistance. The resistance (and thus the temperature) of each of the coils $R_{1A}$, $R_{1B}$ is fixed by separate and independent circuits to the same predetermined value that is governed by the value of resistors $R_{2A}$, $R_{3A}$, $R_{4A}$, and $R_{2B}$, $R_{3B}$, $R_{4B}$, respectively. Control circuitry is provided to maintain each of the coils $R_{1A}$, $R_{1B}$ at the same predetermined value of resistance (and thus, temperature) independently of the rate of fluid flow through the sensor conduit.

In the absence of fluid flow, the circuit of FIG. 2 is configured so that the resistance (and temperature) of each of the downstream and upstream coils $R_{1A}$ and $R_{1B}$ is set to the same predetermined value and the output of the circuit is zero. As fluid flows in the sensor conduit, heat from the upstream coil $R_{1B}$ is carried towards $R_{1A}$. As a result, less energy is required to maintain the downstream coil $R_{1A}$ at the fixed temperature than is required to maintain the upstream coil $R_{1B}$ at that same fixed temperature. The difference in energy required to maintain each of the coils $R_{1A}$, $R_{1B}$ at the predetermined temperature is measured and is proportional to the mass flow rate of fluid flowing through the sensor conduit.

The constant temperature mass flow sensor described with respect FIG. 2 is also relatively easy to construct. In addition, the circuit of FIG. 2 stabilizes more quickly in response to changes in the mass flow rate of the fluid entering the sensor conduit than the constant current mass flow sensor described with respect to FIG. 1. However, because each of the coils $R_{1A}$ and $R_{1B}$ is set and maintained at a predetermined temperature independently of the ambient temperature of the fluid flowing into the sensor conduit, a problem arises when the ambient temperature of the fluid flowing into the sensor conduit increases. In particular, when the ambient temperature of the fluid flowing in the sensor conduit approaches the predetermined temperature that is maintained by the upstream and downstream coils, the circuit loses its ability to discern differences in the flow rate of the fluid, and when the ambient temperature of the fluid increases beyond this predetermined temperature, the sensor is rendered inoperable.

To overcome these disadvantages, a number of alternative constant temperature mass flow sensors have been provided. For example, the circuit of FIG. 3 provides a constant temperature mass flow sensor that is capable of responding to changes in the ambient temperature of a gas or fluid, at least to a certain degree. Once again, $R_{1B}$ and $R_{2B}$ are downstream and upstream temperature sensing coils with a large temperature coefficient of resistance. However, rather than maintaining the temperature of the coils at a predetermined constant value as in the circuit of FIG. 2, the circuit of FIG. 3 maintains the temperature of the sensor coils $R_{1B}$, $R_{2B}$ at a temperature that is above the ambient temperature of the fluid flowing into the sensor conduit. This is achieved by the insertion of an additional coil $R_{3B}$, $R_{4B}$ having a coefficient of resistance similar to that of the sensor coils $R_{1B}$, $R_{2B}$ in each of the downstream and upstream circuits. As the ambient temperature of the fluid changes, the series addition of coil resistance $R_{3B}$, $R_{4B}$ to the temperature setting resistors $R_{5B}$, $R_{6B}$ results in raising the temperature to which the upstream and downstream resistance coils are maintained above the ambient temperature of the fluid flowing into the sensor conduit. As in the circuit of FIG. 2, the difference in energy supplied by each of the downstream and upstream circuits to maintain the temperature of the coils $R_{1B}$, $R_{2B}$ at the same temperature is proportional to the mass flow rate of the fluid through the sensor conduit.

As should be appreciated by those skilled in the art, for the circuit of FIG. 3 to operate properly, it is critical that the values and thermal characteristics of each element in the downstream circuit match that of the corresponding element in the upstream circuit. Thus, the resistance of the downstream and upstream coils $R_{1B}$, $R_{2B}$ must have the same value, and the same thermal coefficient of resistance. In addition, resistor $R_{3B}$ must have the same value and the same (ideally large) thermal coefficient of resistance as resistor $R_{4B}$, resistor $R_{5B}$ must have the same value and same (ideally zero) thermal coefficient of resistance as resistor $R_{6B}$, resistor $R_{7B}$ must have the same value and same (ideally zero) thermal coefficient of resistance as resistor $R_{10B}$, resistor $R_{9B}$ must have the same value and same (ideally zero) thermal coefficient of resistance as resistor $R_{8B}$, and amplifiers 911 and 912 must have the same operating and temperature characteristics.

Despite the addition of resistors $R_{3B}$ and $R_{4B}$, a problem with the circuit of FIG. 3 is that as the ambient temperature of the fluid flowing into the sensor conduit rises, the sensor becomes less accurate because the proportional difference between the temperature of the upstream and downstream coils relative to the temperature of the ambient fluid becomes smaller. Further, there is a problem due to drift in that the calibration of the sensor at one temperature does not necessarily allow its use at other ambient temperatures without some sort of compensation circuit.

To solve some of the aforementioned problems, U.S. Pat. No. 5,401,912 proposes a constant temperature rise (above ambient) mass flow sensor, an example of which is shown in FIG. 4. The circuit of FIG. 4 acts to maintain upstream and downstream sensor coils $R_2$, $R_1$ at a predetermined value above the ambient temperature of the fluid flowing into the sensor conduit. The circuit of FIG. 4 is identical to the circuit of FIG. 2, except that the fixed value resistors $R_{3A}$ and $R_{3B}$ of FIG. 2, which have an essentially zero thermal coefficient of resistance, are replaced with resistors $R_5$ and $R_6$, respectively, having a large and specific valued thermal coefficient of resistance. As a result of these changes, the circuit of FIG. 4 purportedly maintains a constant temperature rise over the ambient temperature of the fluid flowing into the sensor conduit. Such a mass flow sensor as is shown in FIG. 4 is therefore termed a constant temperature difference (over ambient) or a constant temperature rise (over ambient) mass flow sensor.

Each of the aforementioned constant temperature mass flow rate sensors utilizes separate and independent upstream and downstream circuits to set the temperature of the upstream and downstream coils to a particular value, or to a particular value over the ambient temperature of the fluid flowing into the sensor conduit. A disadvantage of each of these circuits is that they require a close matching of corresponding circuit elements (i.e., resistors, coils, and amplifiers) in the upstream and downstream circuits.

SUMMARY OF THE INVENTION

According to one aspect of the present invention, a sensor is provided that includes a first resistive bridge circuit having a first variable resistance resistor and a second resistive bridge circuit having a second variable resistance resistor. According to one embodiment, the first and second resistive bridge circuits share a common reference leg that sets a resistance of the first and second variable resistors. The common reference leg is alternately switchably connected to one of the first and second resistive bridge circuits. According to another embodiment, the first and second resistive bridge circuits share only a portion of the reference leg which sets a resistance of the first and second variable resistors. In this embodiment, the portion of the common reference leg that sets the resistance of the first and second variable resistors is alternately switchably connected to one of the first and second resistive bridge circuits.

According to one embodiment, the sensor comprises a first circuit, a second circuit, a voltage divider, and at least one switch. The first circuit includes a first resistor having a first resistance that varies in response to a change in a physical property. The second circuit includes a second resistor having a second resistance that varies in response to the change in the physical property. The at least one switch has a first state and a second state. The first state of the at least one switch electrically connects the voltage divider to the first circuit to set the resistance of the first resistor, and the second state of the at least one switch electrically connects the voltage divider to the second circuit to set the resistance of the second resistor.

According to another embodiment, the sensor comprises a first amplifier and a second amplifier each having a first input, a second input, and an output, a first resistor and a second resistor, and a voltage divider. The first resistor is electrically connected in series with a first variable resistor between the output of the first amplifier and a reference terminal, with the first resistor being electrically connected between the first input of the first amplifier and the output of the first amplifier, and the first variable resistor being electrically connected between the first resistor and the reference terminal. The second resistor is electrically connected in series with a second variable resistor between the output of the second amplifier and the reference terminal, with the second resistor being electrically connected between the first input of the second amplifier and the output of the second amplifier, and the second variable resistor being electrically connected between the second resistor and the reference terminal. The voltage divider has an input that is switchably connected to one of the output of the first amplifier and the output of the second amplifier, and an output that is switchably connected to one of the second input of the first amplifier and the second input of the second amplifier. The output of the voltage divider sets a resistance of the first variable resistor when the input of the voltage divider is connected to the output of the first amplifier and the output of the voltage divider is connected to the second input of the first amplifier, and sets a resistance of the second variable resistor when the input of the voltage divider is connected to the output of the second amplifier and the output of the voltage divider is connected to the second input of the second amplifier.

According to another aspect of the present invention, a method for use with a pair of bridge circuits is provided. Each bridge circuit has a sensor leg that includes a fixed resistor and a variable resistor and a reference leg that sets a resistance of the variable resistor. The method comprises an act of sharing at least a portion of the reference leg between the first and second circuits to match the resistance of the variable resistors.

According to another aspect of the present invention, a flow sensor is provided to measure a flow rate of a fluid. The flow sensor comprises a first variable resistor, a second variable resistor disposed downstream of the first variable resistor when a flow of the fluid is in a first direction, a first circuit, electrically coupled to the first variable resistor, to provide a first signal indicative of power provided to the first variable resistor, a second circuit, electrically coupled to the second variable resistor, to provide a second signal indicative of power provided to the second variable resistor, and a third circuit, to receive the first and second signals and provide an output signal indicative of a difference between the first and second signals. The range of the output signal when the flow of fluid is in the first direction is symmetric to the range of the output signal when the flow of the fluid is in a second direction that is opposite to the first direction.

According to a further aspect of the present invention, a flow sensor to measure a flow rate of a fluid is provided. The flow sensor comprises a first variable resistor, a second variable resistor, a first circuit, a second circuit, a third circuit, and a power supply circuit. The first circuit is electrically coupled to the first variable resistor to provide a first signal indicative of power provided to the first variable resistor. The second circuit is electrically coupled to the second variable resistor to provide a second signal indicative of power provided to the second variable resistor. The third circuit receives the first and second signals and provides an output signal indicative of a difference between the first and second signals. The power supply circuit is electrically connected to at least one of the first and second circuits to provide a variable amount of power to at least one of the first and second circuits dependent upon the flow rate of the fluid.

According to yet a further aspect of the present invention, a method of detecting a high flow condition in a flow sensor is provided. The method comprises acts of determining an expected zero flow signal at a current operating temperature of the flow sensor, determining a threshold based upon the expected zero flow signal, determining an actual flow signal measured by the flow sensor at the current operating temperature of the flow sensor, comparing the actual flow signal measured by the flow sensor to the threshold, and determining that the high flow condition exists when the actual flow signal exceeds the threshold.

BRIEF DESCRIPTION OF THE DRAWINGS

Illustrative, non-limiting embodiments of the present invention are described by way of example with reference to the accompanying drawings, in which:

FIG. 9B is a detailed schematic diagram illustrating one exemplary implementation of a constant temperature mass flow sensor in accordance with FIG. 9A;

DETAILED DESCRIPTION

Embodiments of the present invention will be understood more completely through the following detailed description which should be read in conjunction with the attached drawings.

FIGS. 5, 6, 7 and 8 illustrate a number of different mass flow sensors according to various embodiments of the present invention. In each of FIGS. 5, 6, 7, and 8, the reference designator $R_U$ represents the upstream coil or resistor, and reference designator $R_D$ represents the downstream coil or resistor. As in the sensor circuits of the prior art, coils $R_U$ and $R_D$ are disposed at spaced apart positions about a sensor conduit (not shown) through which a fluid flows. As defined herein, the term fluid includes any material or combination of materials in a solid, liquid, or gaseous state.

Each of coils $R_U$ and $R_D$ has a large and substantially identical thermal coefficient of resistance, such that the resistance of each coils $R_U$, $R_D$ varies with temperature. Although the upstream and downstream coils $R_U$ and $R_D$ are referred to herein as "coils," it should be appreciated that the present invention is not so limited. For example, the upstream and downstream coils need not be coils that are wound about the exterior of sensor conduit, but may be formed from heat sensitive resistors that are simply affixed to the exterior of the sensor conduit. Such heat sensitive resistors need not have a coiled shape, as they may have a serpentine or ribbon shape instead. Moreover, the upstream and downstream coils need not be disposed on the exterior of the sensor conduit, as for certain fluids, such as air, the coils may be disposed within the sensor conduit. In addition, although embodiments of the present invention are described in terms of a mass flow sensor, the present invention is not so limited, as aspects of the present invention may be used in other applications in which variations in the resistance of a leg of a resistive bridge circuit is indicative of a change in a property that varies with resistance.

Figure 1:
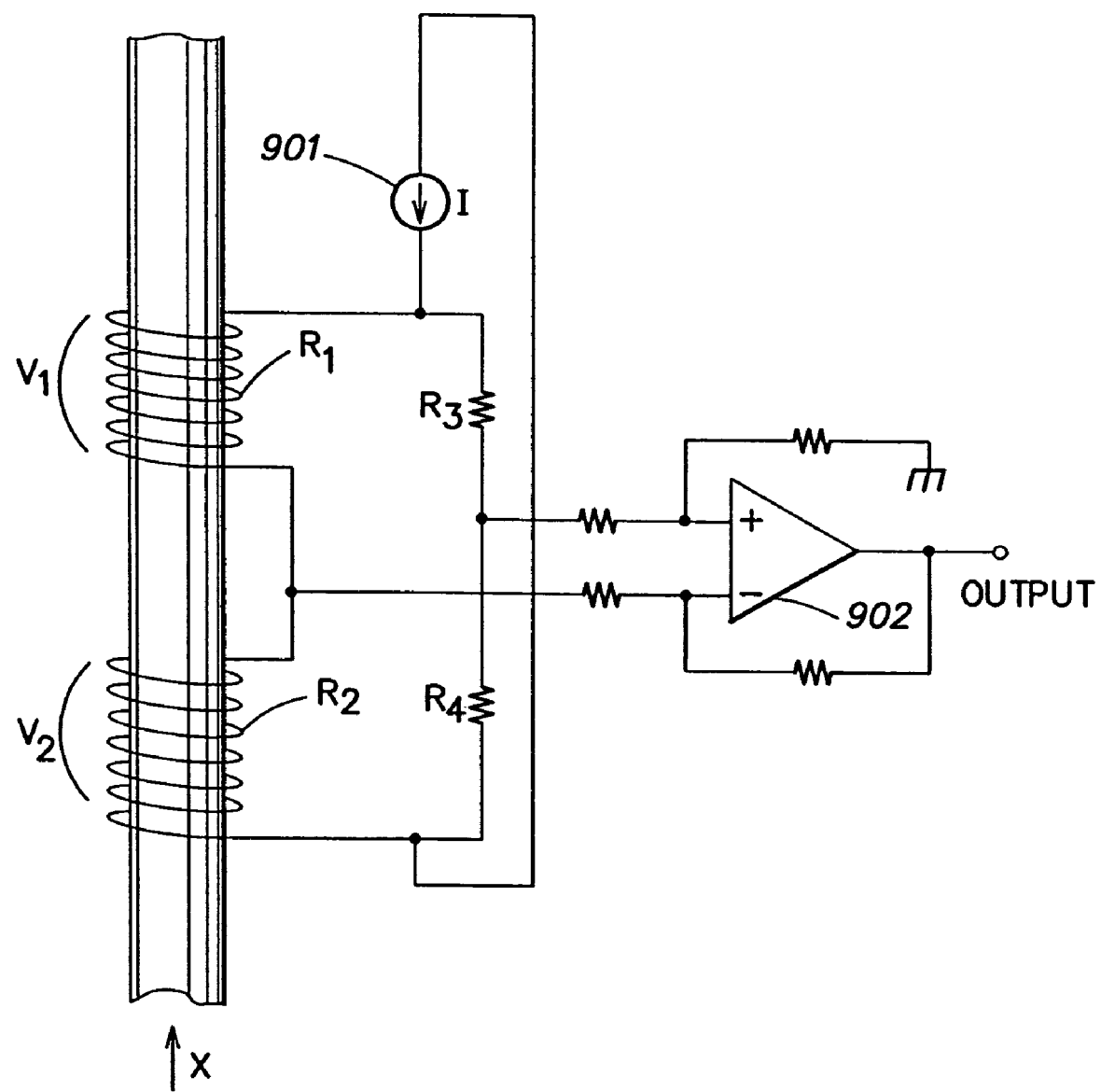
FIG. 1 is a constant current mass flow sensor according to the prior art.
Figure 2:
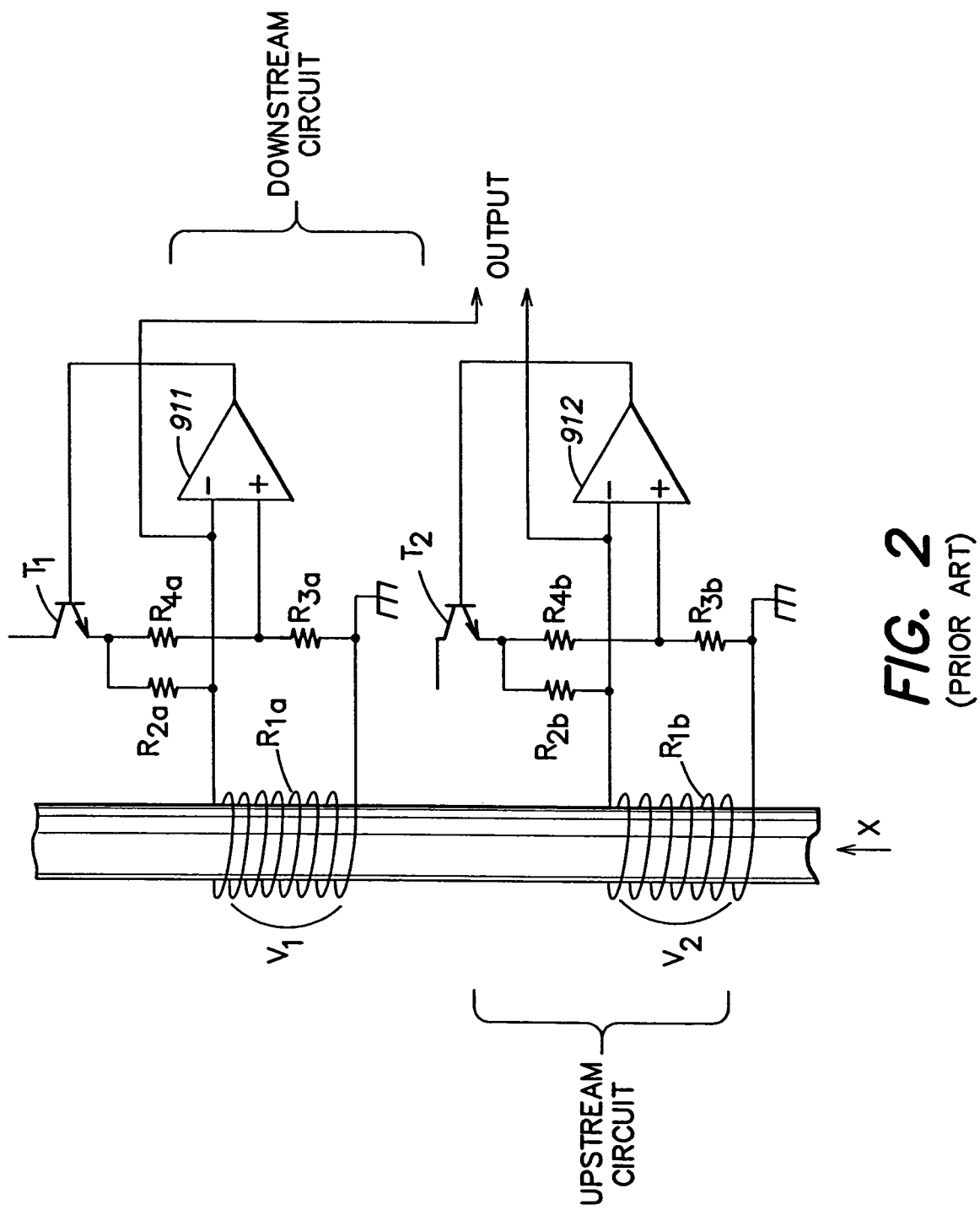
FIG. 2 is a constant temperature mass flow sensor according to the prior art.
Figure 3:
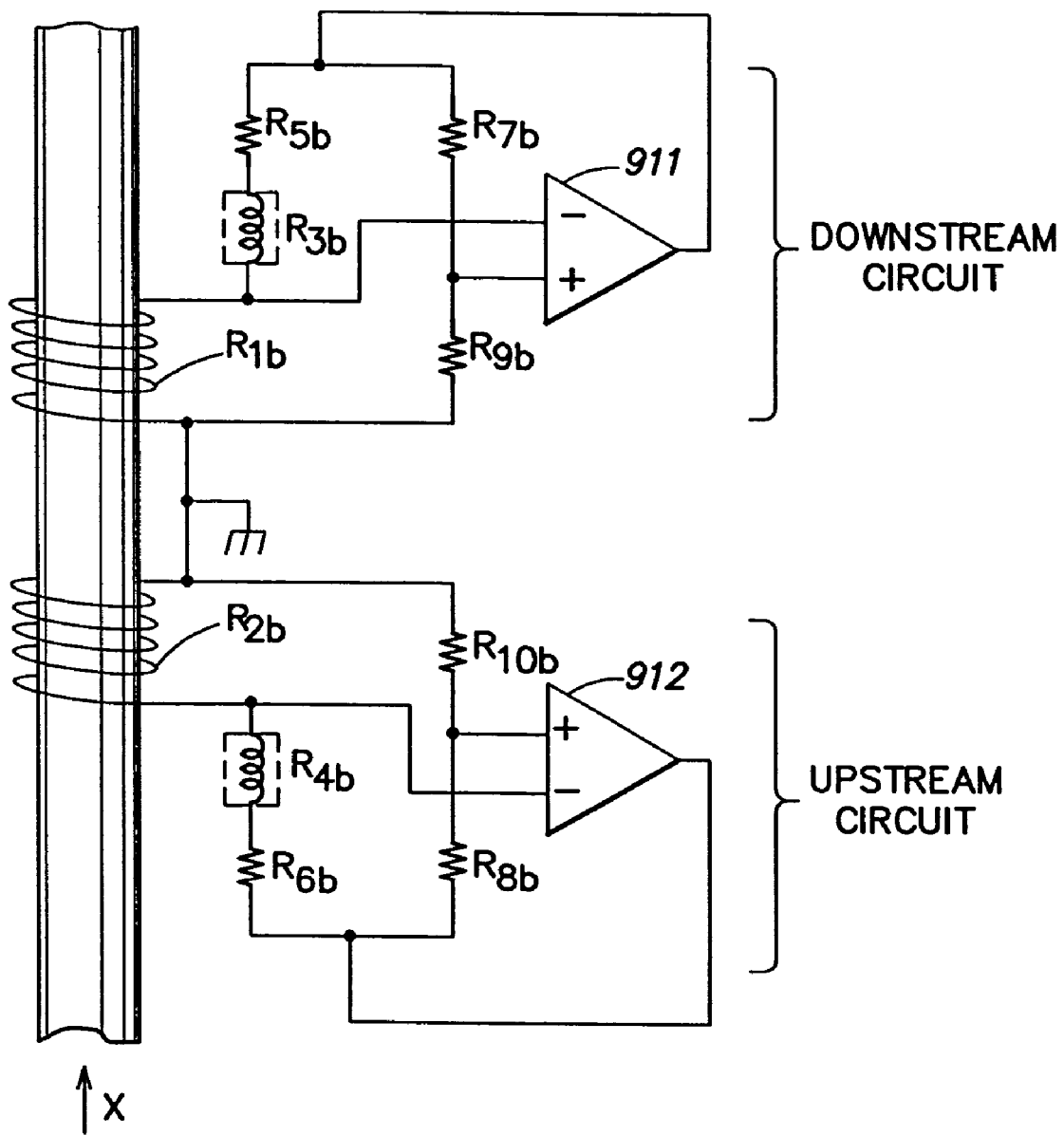
FIG. 3 is a constant temperature mass flow sensor that is capable of responding to changes in an ambient temperature of a fluid according to the prior art.
Figure 4:
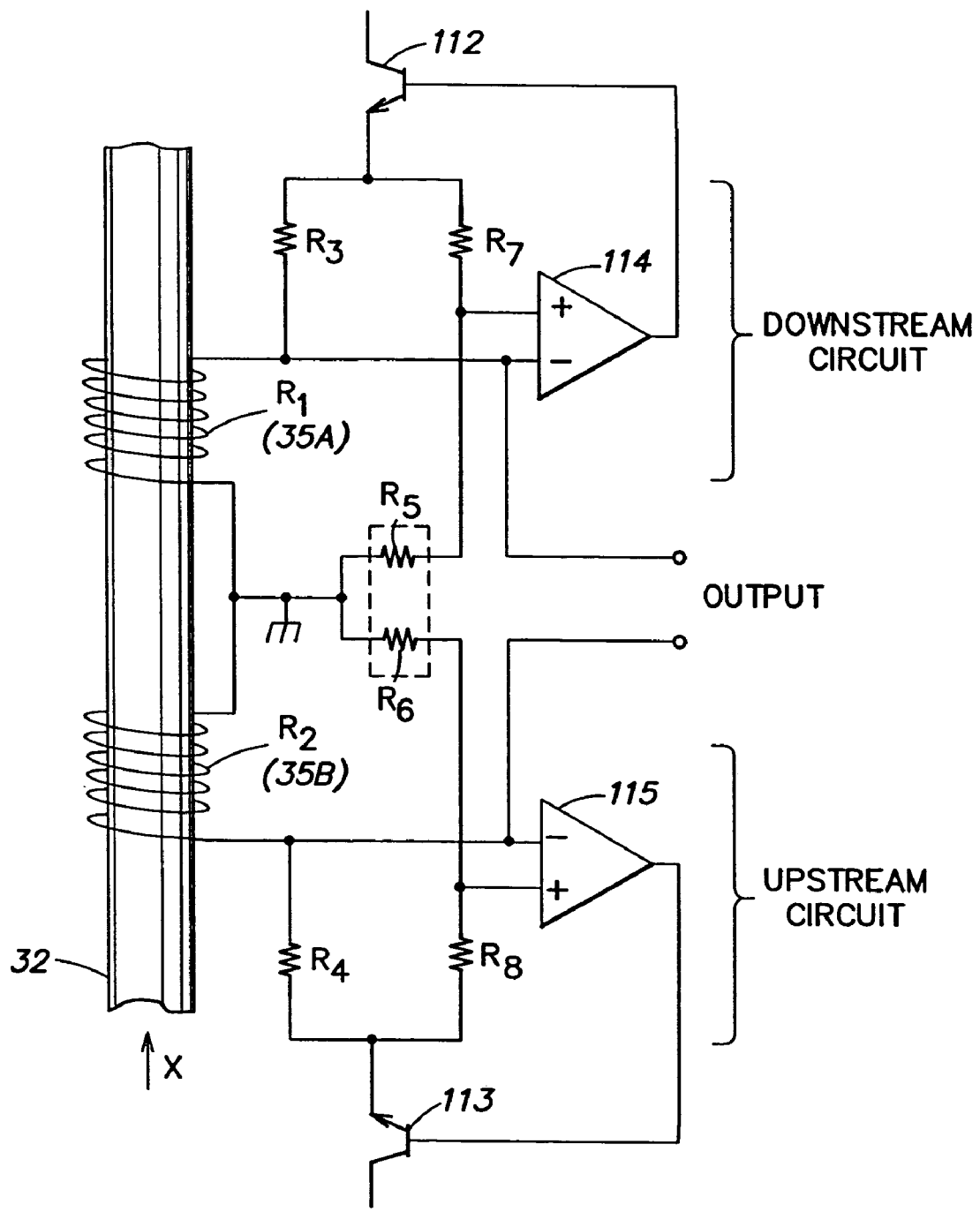
FIG. 4 is another constant temperature mass flow sensor that is capable of responding to changes in an ambient temperature of a fluid according to the prior art.

Although mass flow sensors according to embodiments of the present invention use separate upstream and downstream resistive bridge circuits to set the temperature and resistance of upstream and downstream coils to an identical value, the upstream and downstream circuits share at least a portion of a common reference leg. As a result, embodiments of the present invention do not require the close matching of component values and characteristics that is required in the separate upstream and downstream circuits of FIGS. 2–4. Further, in those embodiments in which the shared and common portion of the reference leg includes a programmable voltage divider, the range of resistance to which the upstream and downstream coils are set can be varied to accommodate a wide range of ambient temperatures.

Figure 5:
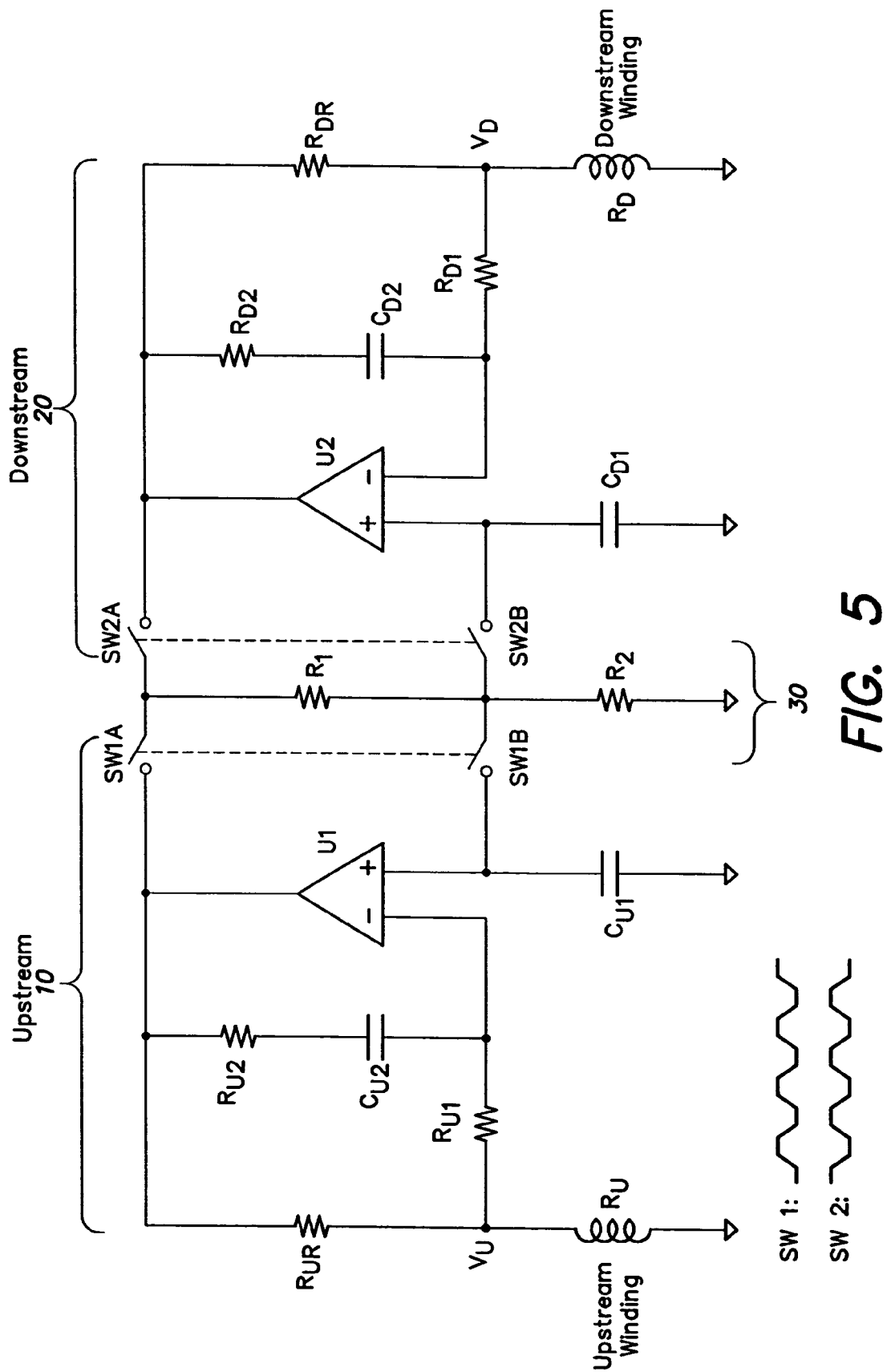
FIG. 5 is a schematic overview of a constant temperature mass flow sensor according to one embodiment of the present invention that includes upstream and downstream resistive bridge circuits that share a common reference leg.

FIG. 5 illustrates a simplified schematic diagram of a mass flow sensor according to one embodiment of the present invention. The sensor circuit includes an upstream resistive bridge circuit 10 and a downstream resistive bridge circuit 20 that are used to set the resistance and, thus, the temperature of the upstream coil $R_U$ and the downstream coil $R_D$, respectively. The upstream and downstream circuits 10, 20 share a common reference leg 30 that in the embodiment depicted in FIG. 5 includes resistors $R_1$ and $R_2$ connected in series.

The upstream circuit 10 includes a first amplifier $U_1$ and a series connection of a first resistor $R_{UR}$ and a first variable resistor $R_U$ (the upstream coil) electrically connected between an output of the first amplifier $U_1$ and a reference terminal. Electrically connected between the output of the first amplifier $U_1$ and the inverting (−) input of the first amplifier $U_1$ is a series connection of a resistor $R_{U2}$ and a capacitor $C_{U2}$. Electrically connected between the mid-point of the first resistor $R_{UR}$ and the first variable resistor $R_U$ and the inverting input of the first amplifier $U_1$ is another resistor $R_{U1}$. A relatively large valued capacitor $C_{U1}$ is electrically connected between the non-inverting (+) input of the first amplifier $U_1$ and the reference terminal. The capacitor $C_{U1}$ maintains a voltage present at the non-inverting input of the first amplifier $U_1$ when the common reference leg 30 is electrically connected to the downstream circuit 20.

The downstream circuit 20 is similar to the upstream circuit 10. The downstream circuit 20 includes a second amplifier $U_2$ and a series connection of a second resistor $R_{DR}$ in series with a second variable resistor $R_D$ that is connected between the output of the second amplifier $U_2$ and the reference terminal. The inverting (−) input of the second amplifier $U_2$ is electrically connected to a mid-point of the series connection of the second resistor $R_{DR}$ and the second variable resistor $R_D$ through a resistor $R_{D1}$, and a resistor $R_{D2}$ in series with a capacitor $C_{D2}$ is electrically connected between the output of the second amplifier $U_2$ and the inverting input of the second amplifier $U_2$. The non-inverting (+) input of the second amplifier $U_2$ is electrically connected a large valued capacitor $C_{D1}$ that is connected to the reference terminal.

As shown in FIG. 5, the circuit further includes a common reference leg 30 that includes a first resistor $R_1$ electrically connected in series with a second resistor $R_2$ that is switchably connected to each of the upstream and downstream circuits 10, 20. The common reference leg $R_1$, $R_2$ sets the value of resistance to which the upstream coil $R_U$ and the downstream coil $R_D$ are set and acts as a voltage divider. Switches $1_A$ and $2_A$ are connected between an input of the voltage divider formed by the series connection $R_1$ and $R_2$ and the output of the first and second amplifiers $U_1$, $U_2$, respectively. Switches $1_B$ and $2_B$ are each respectively connected to the output of the voltage divider and the non-inverting input of the first and second amplifiers $U_1$ and $U_2$, respectively. Switches $1_A$ and $1_B$ and switches $2_A$ and $2_B$ work in tandem such that switches $1_A$ and $1_B$ and switches $2_A$ and $2_B$ are both open or closed at the same time.

During operation, switches $1_A$, $1_B$, and switches $2_A$, $2_B$ are alternately opened and closed to connect the common reference leg 30 to one of the upstream and downstream circuits 10, 20. During the time interval in which the common reference leg is not connected to the upstream circuit (i.e., when switches $1_A$, $1_B$ are open) the capacitor $C_{U1}$ maintains the voltage level at the non-inverting input of the first amplifier $U_1$. Similarly, during the time interval in which the common reference leg is not connected to the downstream circuit (i.e., when switches $2_A$ and $2_B$ are open), the capacitor $C_{D1}$ maintains the voltage level at the non-inverting input terminal of the second amplifier $U_2$.

In operation, the sensor circuit behaves as two constant temperature driver circuits sharing a common reference leg. Switches 1 and 2 are switched rapidly to connect the reference leg 30 ($R_1$ and $R_2$) to the upstream and downstream circuits alternately. $C_{U1}$ and $C_{D1}$ hold the sampled reference feedback when the corresponding switches are open. The first amplifier $U_1$ servos such that $R_U/R_{UR}=R_2/R_1$. The second amplifier $U_2$ servos so that $R_D/R_{DR}=R_2/R_1$. Other amplifiers (not shown in FIG. 5) pick off the upstream and downstream voltage levels $V_U$ and $V_D$ between the series connection of the first resistor $R_{UR}$ and the first variable resistor $R_U$ and the series connection of the second resistor $R_{DR}$ and the second variable resistor $R_D$. The voltage levels $V_U$ and $V_D$ can then be used to provide a signal that is indicative of the flow rate of fluid through the conduit in which, or about which, the upstream and downstream coils $R_U$, $R_D$ are disposed. For example, in one embodiment, the ratio of $V_U-V_D/V_D$ provides the signal that is indicative of the flow rate of fluid, although other comparisons of the voltage levels $V_U$ and $V_D$ may alternatively be used as discussed in detail further below. The remaining components illustrated in FIG. 5, namely $R_{U1}$, $R_{U2}$, $C_{U2}$, $R_{D1}$, $R_{D2}$, and $C_{D2}$, are used to stabilize the first and second amplifiers $U_1$ and $U_2$.

It should be appreciated that because the upstream and downstream circuits 10, 20 share a common reference leg 30 that includes the identical components, the sensor circuit of FIG. 5 dispenses with the need closely match these components. That is, because both the upstream and downstream circuits share the same components of the reference leg, those components are necessarily matched. Thus, in the circuit of FIG. 5, although the ratio of $R_{UR}$ to $R_{DR}$ should be stable and the resistance of $R_{UR}$ and $R_{DR}$ preferably have the same value, it is not required that they be identically matched. It should also be appreciated that in the schematic of FIG. 5, switches 1 and 2 should be closed only after the voltage divider formed by the common reference leg has had an opportunity to stabilize. Although the sensor circuit depicted in FIG. 5 may have some switching noise, this switching noise may be controlled appropriately by switching the switches at an appropriate frequency, for example, at a frequency at or below the Nyquist rate of the A to D converters (not shown) that receive the voltage levels $V_U$ and $V_D$ (where such A to D converters are used), as known to those skilled in the art.

It should further be appreciated that while the simplified schematic drawing of FIG. 5 functionally depicts the operation of the sensor circuit, the circuit can be modified in a variety of ways. For example, high power amplifiers may be needed to provide an appropriate amount of current to the upstream and downstream coils. Alternatively, the output of the first and second amplifiers $U_1$ and $U_2$ may be electrically connected to a large output transistor to provide an appropriate amount of current. Moreover, the present invention is not limited to the use of four switches $1_A$, $1_B$, and switches $2_A$, $2_B$, as fewer switches may be used. It should further be appreciated that in various implementations, the common reference leg 30 formed by $R_1$ and $R_2$ may be replaced with a programmable voltage divider. Thus, with appropriate control of the programmable voltage divider, a programmable temperature rise sensor driver may be provided. An embodiment of a flow sensor that includes a programmable voltage divider is now described with respect to FIG. 6.

Figure 6:
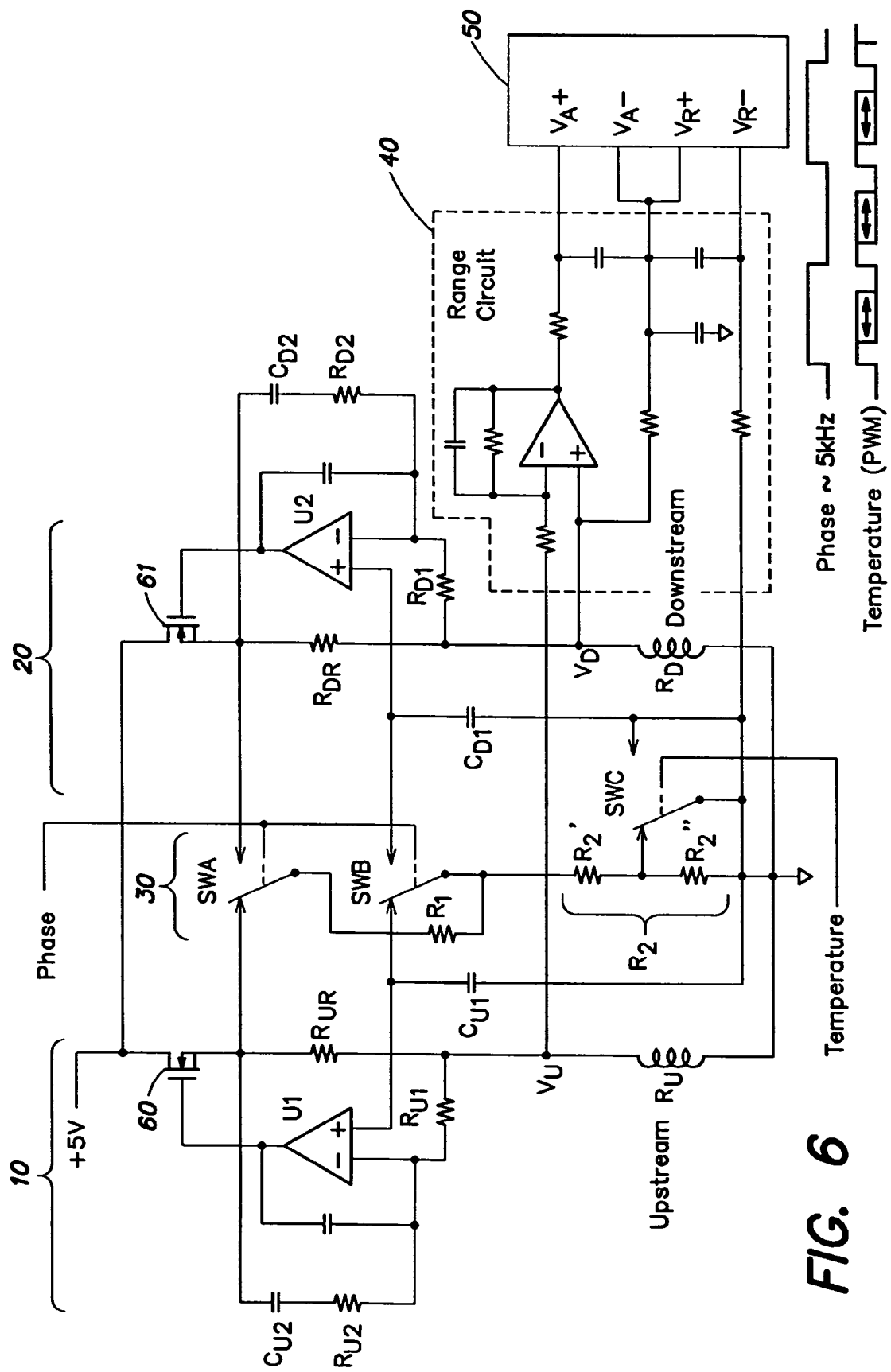
FIG. 6 is a schematic overview of a constant temperature mass flow sensor according to another embodiment of the present invention in which the common reference leg includes a programmable voltage divider.
Figure 7A:
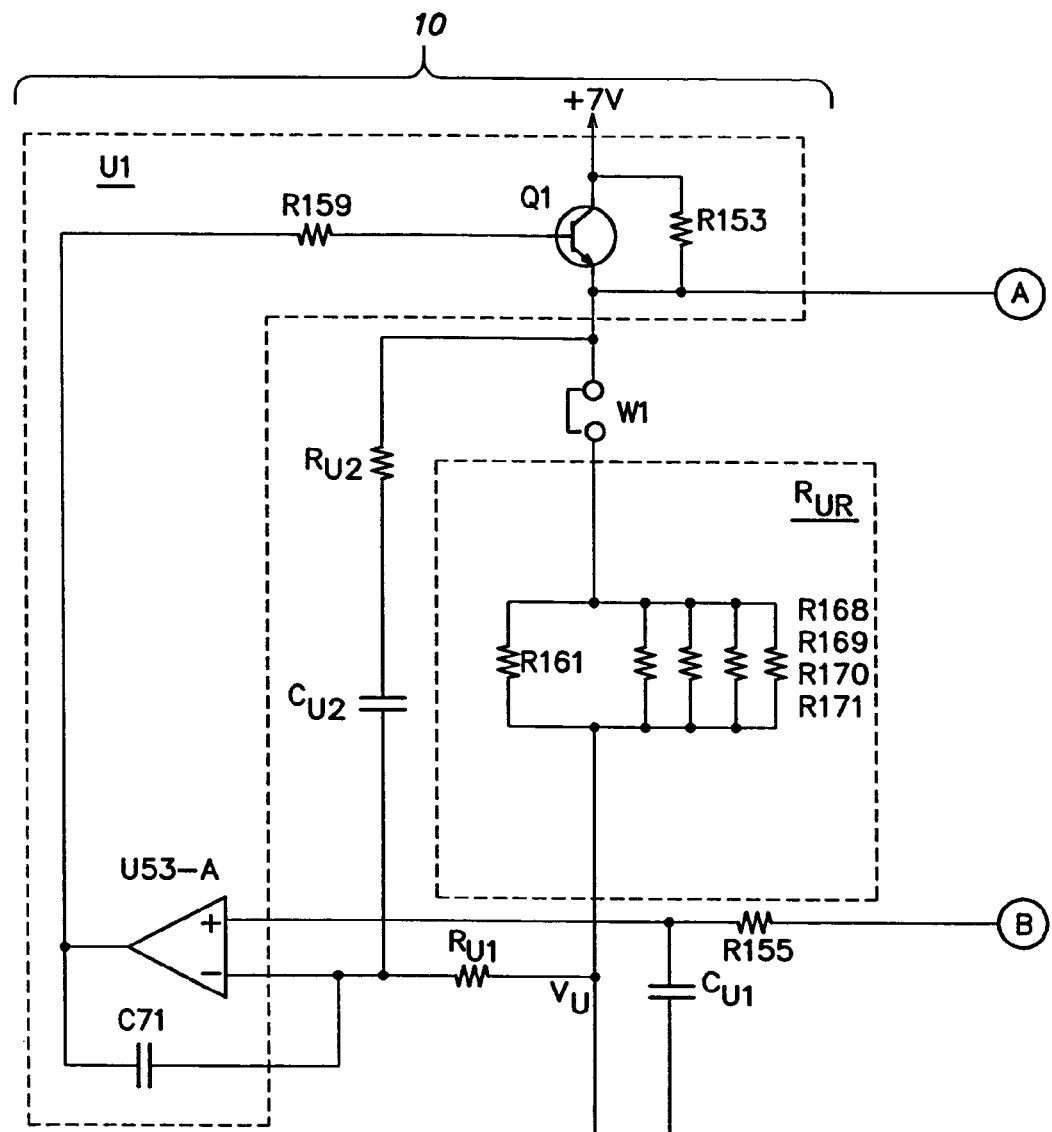
FIG. 7 is a detailed schematic diagram illustrating one exemplary implementation of a constant temperature mass flow sensor in accordance with FIG. 6.
Figure 7B:
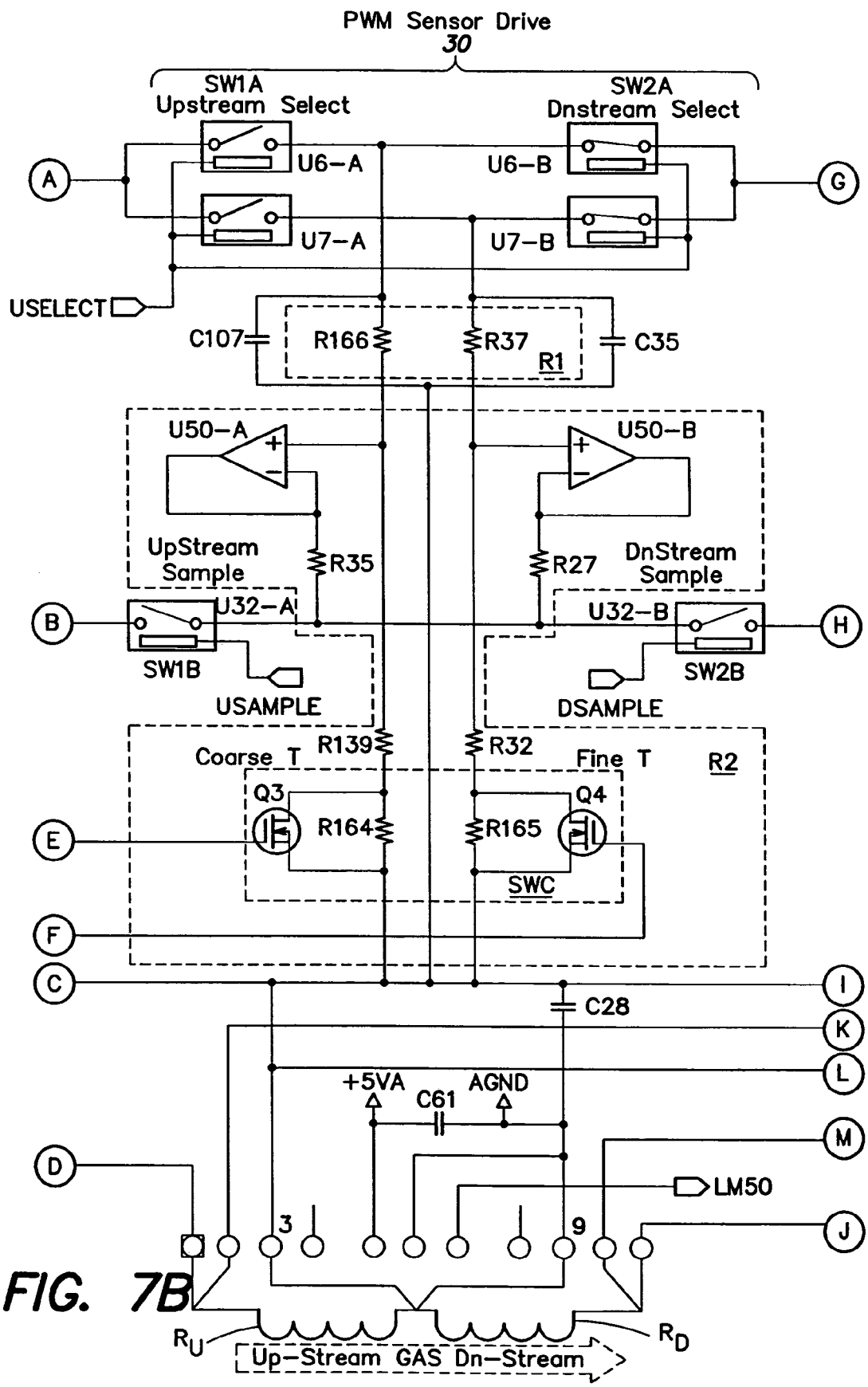
Figure 7C:
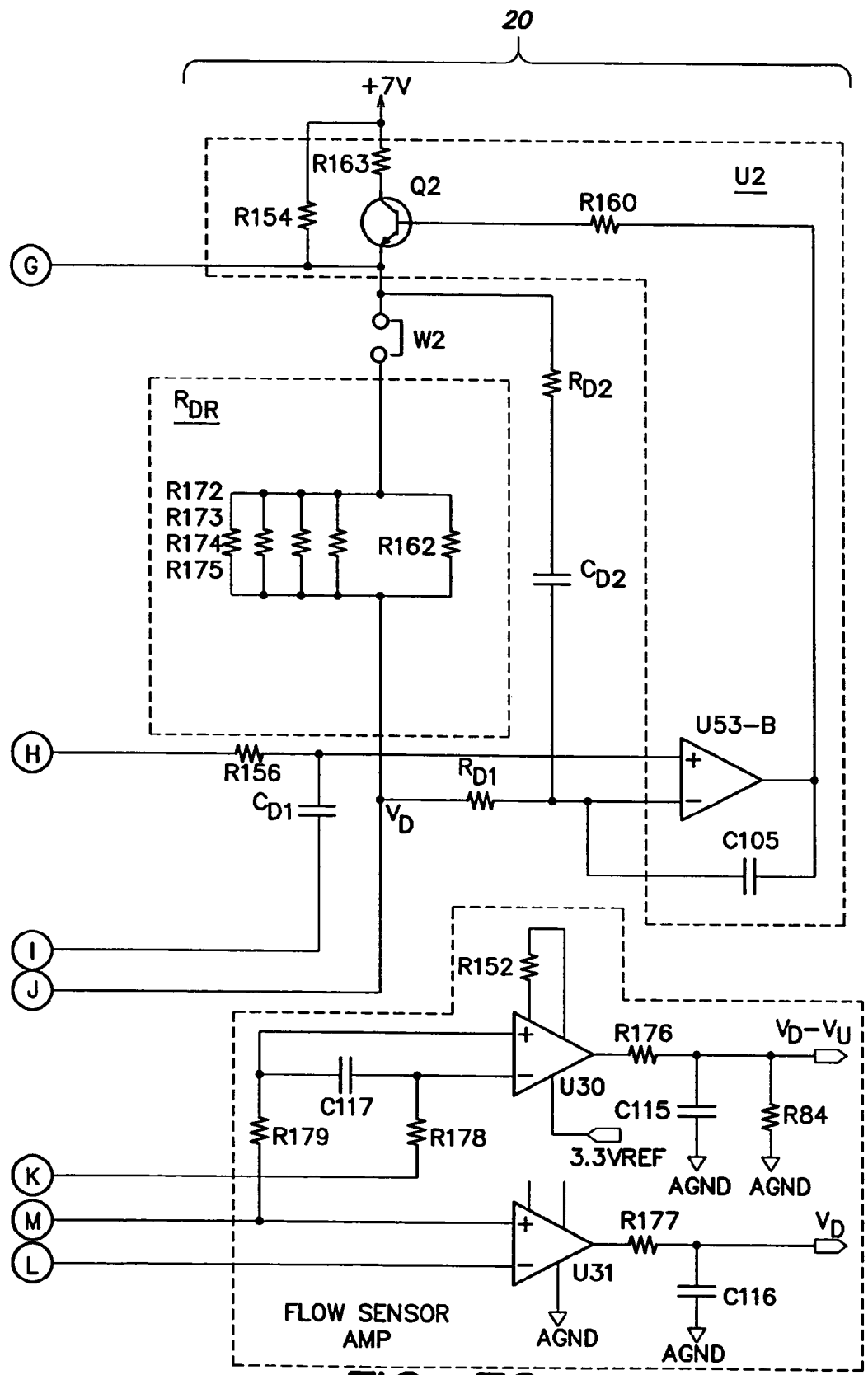
Figure 7D:
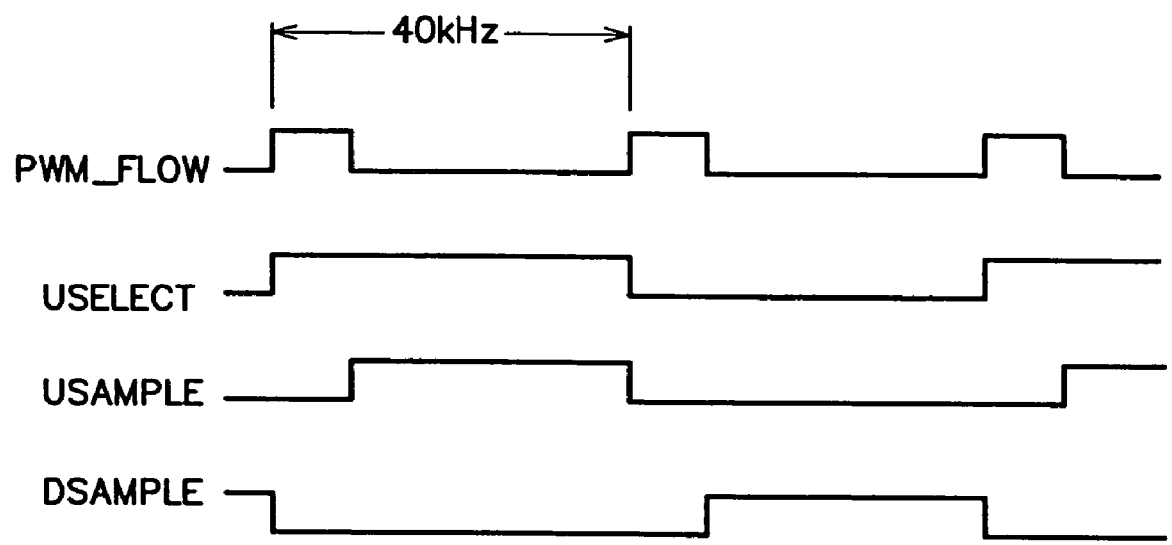

FIG. 6 illustrates a mass flow sensor according to another embodiment of the present invention in which large output transistors 60, 61 are provided at the output of each of the first and second amplifiers $U_1$ and $U_2$, respectively. The circuit of FIG. 6 also includes an amplifier or range circuit 40 that may be used to provide greater range for the voltage signals $V_U$ and $V_D$. In the embodiment depicted in FIG. 6, the voltage signals $V_U$ and $V_D$ are provided to an A-D converter 50.

In contrast to the embodiment of FIG. 5, the sensor of FIG. 6 includes only two switches, switch A and switch B, that are used to switchably connect the common reference leg 30 (formed by resistors $R_1$ and $R_2$) to one or the other of the upstream and downstream circuits 10, 20. In the position shown in FIG. 6, switches A and B are both connected to the upstream circuit 10, although at a different time they may be switched to be connected to the downstream circuit 20.

In further contrast to the sensor circuit of FIG. 5 which included a fixed voltage divider forming the common reference leg 30, the circuit of FIG. 6 includes a programmable voltage divider. Specifically, as depicted in FIG. 6, a temperature signal is provided to a third switch C that connects one or more resistors between the output of the voltage divider and the reference terminal. When the switch C is in a closed state (that is, connected to the midpoint between the resistors labeled $R_{2'}$ and $R_{2''}$), the voltage provided by the output of the voltage divider is proportional to $R_{2'}/(R_1+R_{2'})$, whereas when the switch C is in an open position, or is connected to the capacitor $C_{D1}$, the output of the voltage divider is proportional to $(R_{2'}+R_{2''})/(R_1+R_{2'}+R_{2''})$. By providing a pulse-width modulated signal to the switch C, output voltages from the voltage divider that are between these two values may be provided, with the division ratio being adjusted by the frequency and duration of the pulse-width modulated signal. As with the embodiment described above with respect to FIG. 5, although the ratio of $R_{UR}$ to $R_{DR}$ should be stable and the resistance of $R_{UR}$ and $R_{DR}$ preferably have the same value, it is not required that they be identically matched.

FIG. 7 illustrates a schematic diagram of one exemplary implementation of a mass flow sensor according to an embodiment of the present invention. In FIG. 7, those portions of the circuit performing similar functions as described above with respect to FIGS. 5 and 6 are indicated by the same reference designators. For example, in FIG. 7, the first amplifier $U_1$ may be formed by the combination of the amplifier U53-A, capacitor C71, resistor R159, transistor Q1, and resistor R153. The downstream amplifier $U_2$ is formed similarly from the combination of amplifier U53-B, capacitor C105, resistor R160, transistor Q2, and resistors R163 and R154.

In FIG. 7, the resistor $R_{UR}$ is formed by a parallel combination of a number of like valued resistors to achieve the desired precision in resistance values, as is the corresponding resistor $R_{DR}$. It should be appreciated that other ways of providing these resistors may be provided, as embodiments of the present invention are not limited to the particular implementation shown.

The common reference leg in FIG. 7 is again formed by the series combination of $R_1$ and $R_2$. However, in the schematic of FIG. 7, the output of the voltage divider may be set to provide a wide range of values. Specifically, based upon a course resistance adjustment signal PWM_I-COARSE that is provided to transistor Q3, and a fine resistance adjustment signal PWM_IFINE that is provided to transistor Q4, a range of resistance values may be provided for the resistor $R_2$. Thus, by appropriately modulating the course and fine adjustment signals, in terms of frequency and duration, provided to transistors $Q_3$ and $Q_4$, a range of resistance values may be provided.

Switches $1_A$ and $2_A$ are used to connect the input of the voltage divider formed by the series combination of resistors $R_1$ and $R_2$ to one of the upstream and downstream circuits, while the switches $1_B$ and $2_B$ are used to connect the output of the voltage divider to the non inverting (+) input of one of the first and second amplifiers $U_1$ and $U_2$. During the time period during which the switch $1_B$ is closed, the capacitor $C_{U1}$ is charged up to the value of $V_U$, and during the period in which switch $2_B$ is closed, the capacitor $C_{D1}$ is charged up to the value of $V_D$. By providing a sampling signal that is delayed in time relative to the signals that selectively connect the input of the voltage divider to the output of one of the first and second amplifiers, the voltage divider is permitted time to stabilize prior to the sampling of the upstream and downstream voltage levels $V_U$ and $V_D$.

Figure 8A:
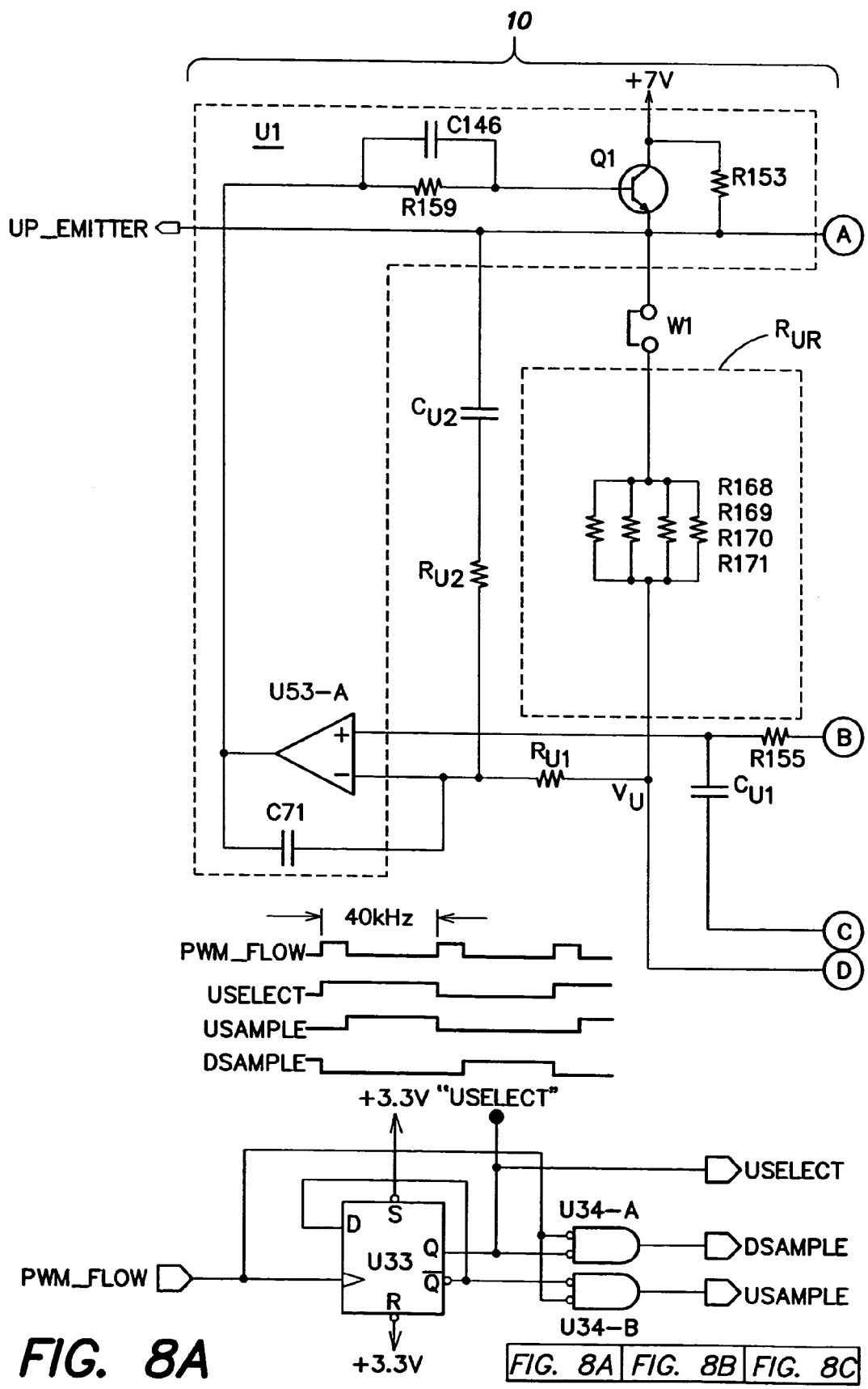
FIG. 8 is a detailed schematic diagram illustrating another exemplary implementation of a constant temperature mass flow sensor in which the common reference leg includes a programmable voltage divider.
Figure 8B:
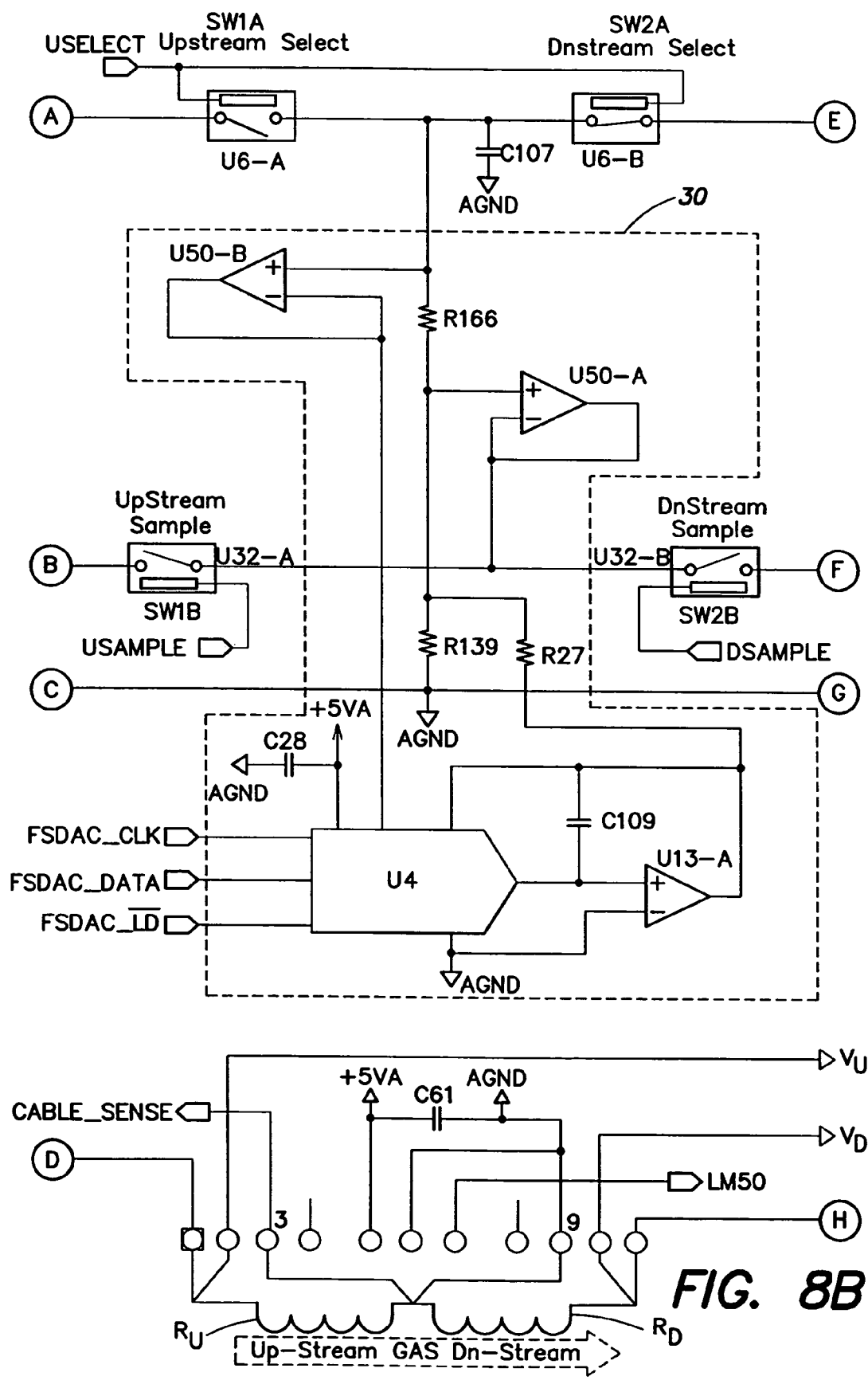
Figure 8C:
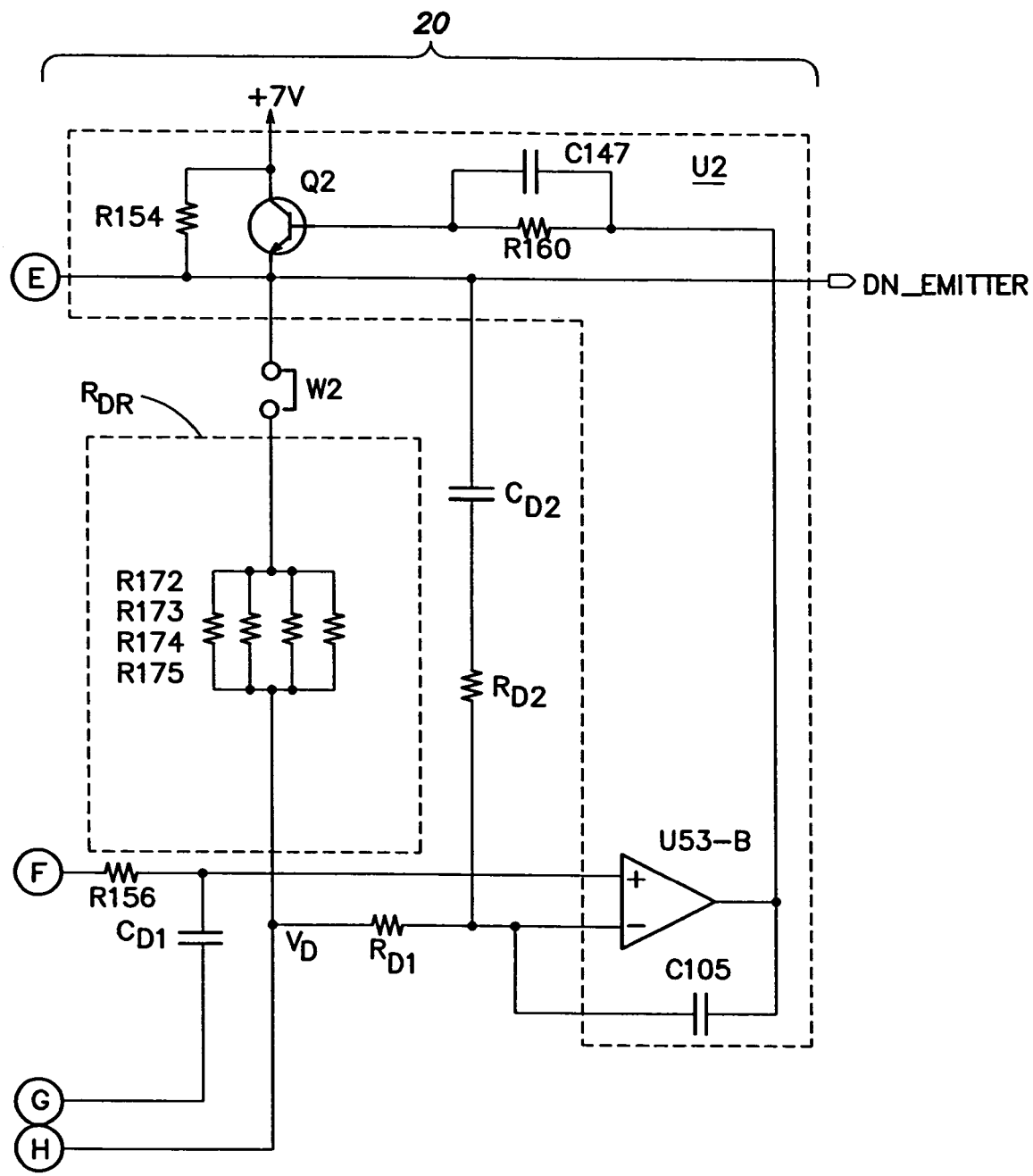

FIG. 8 illustrates a schematic diagram of another exemplary implementation of a mass flow sensor according to an embodiment of the present invention. In FIG. 8, those portions of the circuit performing similar functions as described above with respect to FIGS. 5, 6, and 7 are indicated by the same reference designators. For example, in FIG. 8, the first amplifier $U_1$ may be formed by the combination of the amplifier U53-A, capacitor C71, resistor R159 and capacitor C146, transistor Q1, and resistor R153. The downstream amplifier $U_2$ is formed similarly from the combination of amplifier U53-B, capacitor C105, resistor R160 and capacitor C147, transistor Q2, and resistor R154. As in the embodiment of FIG. 7, transistors Q1 and Q2 are used to provide sufficient current to each of the upstream and downstream coils $R_U$ and $R_D$. In FIG. 8, each of the resistors $R_{UR}$ and $R_{DR}$ is again formed by a parallel combination of a number of like valued resistors to achieve the desired precision in resistance values, in a manner similar to FIG. 7. It should be appreciated that other ways of providing these resistors may be provided, as embodiments of the present invention are not limited to the particular implementation shown.

In a manner similar to the embodiment of FIG. 7, the common reference leg 30 in FIG. 8 includes a programmable voltage divider that may be used to provide a wide range of resistive values and thus, division ratios. However, in contrast to the embodiment of FIG. 7, in which the output of the programmable voltage divider varies in accordance with Pulse Width Modulated (PWM) control signals PWM_I-COARSE and PWM_IFINE that are provided to separate transistors Q3 and Q4, a single multiplying Digital to Analog (D/A) converter circuit is used instead. In FIG. 8, the D/A converter circuit includes U50-B, U4, U13-A, and C109. In the illustrated embodiment, U4 is a sixteen bit multiplying D/A converter that converts a voltage level to a current. The current is converted to a variable output voltage through the use of an amplifier U13-A that is coupled to the output of the D/A converter U4. The D/A converter circuit feeds a single reference divider that includes R27, R139, and R166, and buffer amplifier U50-A. Each of the sample and hold circuits (U32-A, R155, and C111($C_{U1}$); U32-B, R156, and C112 ($C_{D1}$)) is switchably connected to the output of the programmable voltage divider. With reference to FIGS. 5 and 6, the resistor $R_1$ may correspond to R166, and the resistor $R_2$ may correspond to the combination of R139, R27, and the D/A converter circuit.

It should be appreciated that the embodiment of FIG. 8 shares many of the same advantages as the embodiment of FIG. 7, in that each embodiment includes a common reference leg 30 that is shared completely between the upstream and downstream circuits. Given equal series resistors upstream (R168–R171) and downstream (R172–R175), both embodiments provide exceptionally good matching between upstream and downstream coil resistances. However, the embodiment of FIG. 8 is significantly faster than the embodiment of FIG. 7. For example, in one implementation, the embodiment of FIG. 7 exhibited a compensated rise time of approximately 110 ms (measured from 2% to 98% on the rising edge of a fluid pulse), but it was noted that the 2% point was delayed by approximately 30 ms from the rising edge of the fluid pulse. This delay is believed to be due to the time constant of the RC filter incorporated into the sample and hold circuits of FIG. 7 (i.e., U32-A, R155, and C111 ($C_{U1}$); U32-B, R156, and C112 ($C_{D1}$)) having a time constant of approximately 50 us. In contrast, an implementation of the embodiment of FIG. 8 exhibited a compensated rise time of approximately 100 ms (measured from 2% to 98% on the rising edge of a fluid pulse), but with substantially less delay to the 2% point from the rising edge of the fluid pulse. This reduction in the delay is believed to be attributable to the reduction in the time constant of the RC filter incorporated into the sample and hold circuits (i.e., U32-A, R155, and C111 ($C_{U1}$); U32-B, R156, and C112 ($C_{D1}$)) in the embodiment of FIG. 8 having a time constant of approximately 0.33 us. Although the embodiment of FIG. 8 is significantly faster than the embodiment of FIG. 7, the embodiment of FIG. 7 provides a lower cost alternative to the embodiment of FIG. 8. Moreover, it should be appreciated that response time of the embodiment of FIG. 7 is still approximately twice that of conventional mass flow sensors.

Figure 9A:
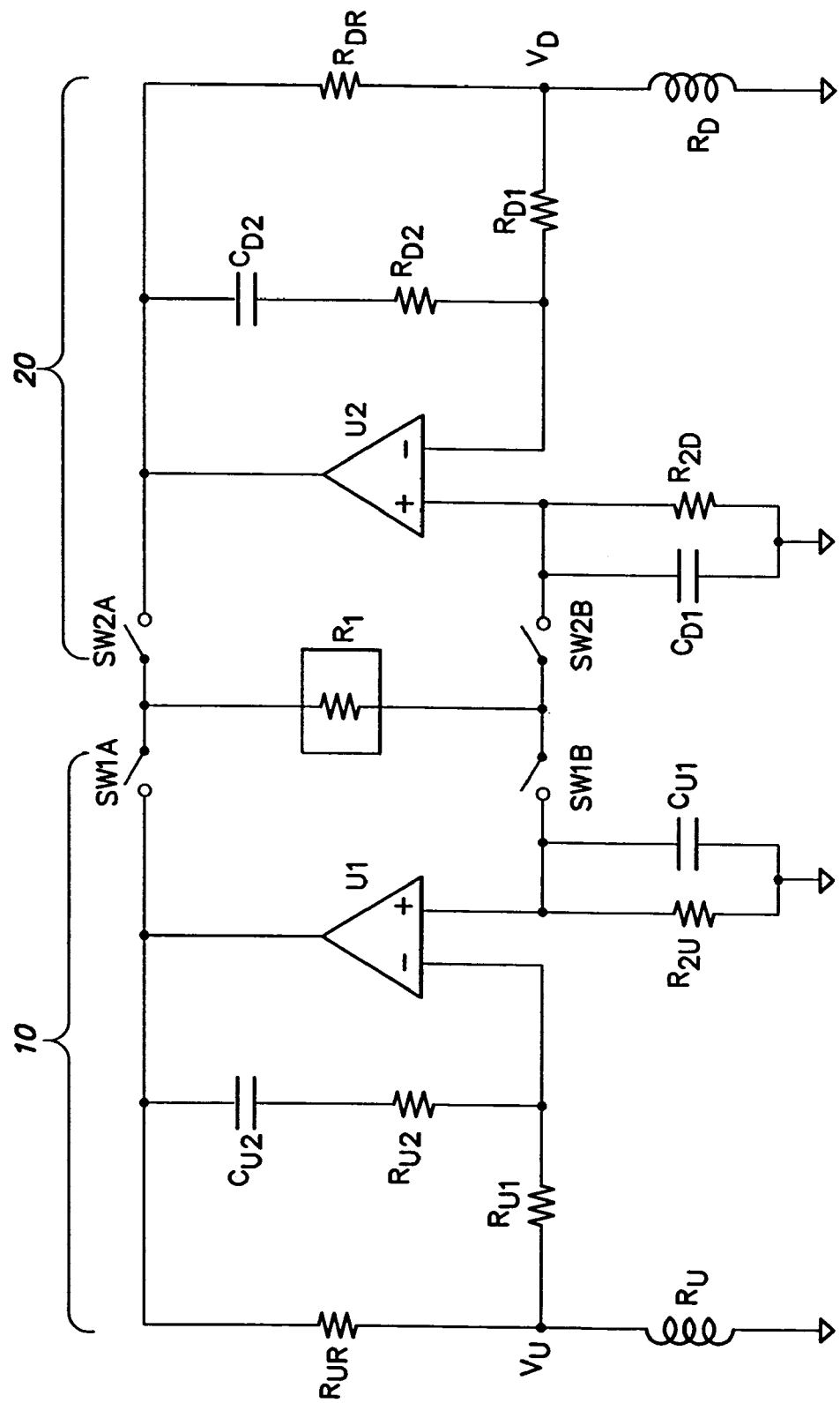
FIG. 9A is a schematic overview of a constant temperature mass flow sensor according to another embodiment of the present invention in which the upstream and downstream resistive bridge circuits share only a portion of the common reference leg.

FIGS. 9A and 9B illustrate a mass flow sensor according to another aspect of the present invention in which only a portion of the reference leg is common to both the upstream and downstream circuits 10, 20. As in each of FIGS. 5, 6, 7, and 8, the reference designator $R_U$ represents the upstream coil or resistor, and reference designator $R_D$ represents the downstream coil or resistor. As previously described, coils $R_U$ and $R_D$ may, for example, be disposed at spaced apart positions about a sensor conduit (not shown) through which a fluid flows, with each coil $R_U$ and $R_D$ having a large and substantially identical thermal coefficient of resistance, such that the resistance of each coils $R_U$, $R_D$ varies with temperature. It should again be appreciated that although the upstream and downstream coils are referred to as "coils," the present invention is not so limited. Moreover, although embodiments of the present invention are described in terms of a mass flow sensor, the present invention is not so limited, as aspects of the present invention may be used in other applications in which variations in the resistance of a leg of a resistive bridge circuit is indicative of a change in a property that varies with resistance.

FIG. 9A illustrates a simplified schematic diagram of a mass flow sensor in which only a portion of a reference leg is shared between separate upstream and downstream circuits. The sensor includes an upstream resistive bridge circuit 10 and a downstream resistive bridge circuit 20 that are used to set the resistance and, thus, the temperature of the upstream coil $R_U$ and the downstream coil $R_D$, respectively.

The upstream circuit 10 includes a first amplifier $U_1$, a series connection of a first resistor $R_{UR}$ and a first variable resistor $R_U$ (the upstream coil) electrically connected between an output of the first amplifier $U_1$ and a reference terminal. Electrically connected between the output of the first amplifier $U_1$ and the inverting (–) input of the first amplifier $U_1$ is a series connection of a capacitor $C_{U2}$ and a resistor $R_{U2}$. Electrically connected between the mid-point of the first resistor $R_{UR}$ and the first variable resistor $R_U$ and the inverting input of the first amplifier $U_1$ is another resistor $R_{U1}$. A relatively large valued capacitor $C_{U1}$ is electrically connected between the non-inverting (+) input of the first amplifier $U_1$ and the reference terminal. A resistor $R_{2U}$ is connected in parallel with the capacitor $C_{U1}$ between the non-inverting (+) input of the first amplifier $U_1$ and the reference terminal. The resistor $R_{2U}$ forms a portion of the reference leg of the upstream circuit 10.

The downstream circuit 20 is similar to the upstream circuit 10. The downstream circuit 20 includes a second amplifier $U_2$, and a series connection of a second resistor $R_{DR}$ in series with a second variable resistor $R_D$ (the downstream coil) that is connected between the output of the second amplifier $U_2$ and the reference terminal. The inverting (–) input of the second amplifier $U_2$ is electrically connected to a mid-point of the series connection of the second resistor $R_{DR}$ and the second variable resistor $R_D$ through a resistor $R_{D1}$, and a capacitor $C_{D2}$ in series with a resistor $R_{D2}$ is electrically connected between the output of the second amplifier $U_2$ and the inverting input (–) of the second amplifier $U_2$. The non-inverting (+) input of the second amplifier $U_2$ is electrically connected a large valued capacitor $C_{D1}$ that is connected to the reference terminal, and a resistor $R_{2D}$ is connected in parallel with the capacitor $C_{D1}$ between the non-inverting (+) input of the second amplifier $U_2$ and the reference terminal. The resistor $R_{2D}$ forms a portion of the reference leg of the downstream circuit 20.

As shown in FIG. 9A, the circuit further includes a common resistor $R_1$ that is switchably connected to one of the upstream and downstream circuits 10, 20 via a respective switch $1_A$ and $2_A$. The common resistor $R_1$ is electrically connected in series with one of resistor $R_{2U}$ or $R_{2D}$ via switches $1_B$ and $2_B$ to form the reference leg of each of the upstream and downstream circuits 10, 20. The reference leg that is formed by the series connection of $R_1$ with one of $R_{2U}$ and $R_{2D}$ sets the value of resistance to which the upstream coil $R_U$ and the downstream coil $R_D$ are set and acts as a voltage divider. As shown, switches $1_A$ and $2_A$ are connected between an input of the voltage divider formed by the series connection $R_1$ and one of $R_{2U}$ and $R_{2D}$ and the output of the first and second amplifiers $U_1$, $U_2$, respectively. Switches $1_B$ and $2_B$ are each respectively connected to the output of the voltage divider and the non-inverting input of the first and second amplifiers $U_1$ and $U_2$, respectively. Switches $1_A$ and $1_B$ and switches $2_A$ and $2_B$ work in tandem, such that switches $1_A$ and $1_B$ and switches $2_A$ and $2_B$ are both open or closed at the same time.

During operation, switches $1_A$, $1_B$, and switches $2_A$, $2_B$ are alternately opened and closed to connect the common resistor $R_1$ to one of the upstream and downstream circuits 10, 20. During the time interval in which the common resistor $R_1$ is not connected to the upstream circuit 10 (i.e., when switches $1_A$, $1_B$ are open) the capacitor $C_{U1}$ maintains the voltage level at the non-inverting input of the first amplifier $U_1$. Similarly, during the time interval in which the common resistor $R_1$ is not connected to the downstream circuit 20 (i.e., when switches $2_A$ and $2_B$ are open), the capacitor $C_{D1}$ maintains the voltage level at the non-inverting input terminal of the second amplifier $U_2$.

In operation, the sensor behaves as two constant temperature driver circuits sharing a portion of a reference leg. Switches 1 and 2 are switched rapidly to connect the reference leg ($R_1$ and one of $R_{2U}$ or $R_{2D}$) to the upstream and downstream circuits alternately. $C_{U1}$ and $C_{D1}$ hold the sampled reference feedback when the corresponding switches are open. The first amplifier $U_1$ servos such that $R_U/R_{UR}=R_{2U}/R_1$. The second amplifier $U_2$ servos so that $R_D/R_{DR}=R_{2D}/R_1$. Other amplifiers (not shown in FIG. 9A) pick off the upstream and downstream voltage levels $V_U$ and $V_D$ between the series connection of the first resistor $R_{UR}$ and the first variable resistor $R_U$ and the series connection of the second resistor $R_{DR}$ and the second variable resistor $R_D$. The voltage levels $V_U$ and $V_D$ can then be used to provide a signal that is indicative of the flow rate of fluid through the conduit in which, or about which, the upstream and downstream coils $R_U$, $R_D$ are disposed. For example, in certain embodiments, the ratio of $(V_U-V_D)/V_D$ or $(V_U-V_D)/V_U$ may be used to provide the signal that is indicative of the flow rate of fluid. In other embodiments, described more fully below, the voltage levels $V_U$ and $V_D$ may be combined to provide a ratio of $(V_U-V_D)/(V_U+V_D)$ which is also indicative of the flow rate of the fluid, but provides a signal having a range that is symmetric independent of the direction of the flow of fluid (e.g., from the upstream coil to the downstream coil, or from the downstream coil to the upstream coil). The remaining components illustrated in FIG. 9A, namely $R_{U1}$, $R_{U2}$, $C_{U2}$, $R_{D1}$, $R_{D2}$, and $C_{D2}$, are used to stabilize the first and second amplifiers $U_1$ and $U_2$.

It should be appreciated that the circuit of FIG. 9A is functional in nature and may be modified in a variety of ways. For example, high power amplifiers may be used to provide an appropriate amount of current to the upstream and downstream coils. Alternatively, the output of the first and second amplifiers may be electrically connected to a large output transistor to provide an appropriate amount of current. Moreover, this embodiment is not limited to the use of four switches $1_A$, $1_B$, and switches $2_A$, $2_B$, as fewer switches may be used. It should also be appreciated that in various implementations, the reference leg formed by $R_1$ and one of $R_{2U}$ and $R_{2D}$ may be replaced with a programmable voltage divider. Thus, with appropriate control of the programmable voltage divider, a programmable temperature rise sensor driver may be provided. An embodiment of a flow sensor that includes a programmable voltage divider is now described with respect to FIG. 9B.

FIG. 9B illustrates a schematic diagram of an exemplary implementation of a mass flow sensor in which separate upstream and downstream circuits share only a portion of a reference leg according to an embodiment of the present invention. In FIG. 9B, those portions of the circuit performing similar functions as described above with respect to FIG. 9A are indicated by the same reference designators. For example, in FIG. 9B, the first amplifier $U_1$ may be formed by the combination of the amplifier U53-A, capacitor C71, resistor R159 and capacitor C146, transistor Q1, and resistor R153. The downstream amplifier $U_2$ is formed similarly from the combination of amplifier U50-A, capacitor C105, resistor R160 and capacitor C147, transistor Q2, and resistor R154. As in the embodiments of FIGS. 7 and 8, transistors Q1 and Q2 are used to provide sufficient current to each of the upstream and downstream coils $R_U$ and $R_D$.

In FIG. 9B, each of the resistors $R_{UR}$ and $R_{DR}$ is again formed by a parallel combination of a number of like valued resistors to achieve the desired precision in resistance values, in a manner similar to FIGS. 7 and 8. However, it should be appreciated that other ways of providing these resistors may be provided, as embodiments of the present invention are not limited to the particular implementation shown.

In the embodiment of FIG. 9B, the shared resistor $R_1$ that is common to each of the upstream and downstream circuits is a variable resistor that can be used to form a programmable voltage divider in combination with $R_{2U}$ and $R_{2D}$ of the upstream and downstream circuits to permit a range of resistive values and thus, division ratios. For example, reference leg division ratios that may be provided by the embodiment of FIG. 9B may vary from approximately 0.770 to 0.834. In the illustrated embodiment, the common shared resistor $R_1$ includes a multiplying Digital to Analog (D/A) converter circuit that includes U4, U13-A, U13-B, C109, and resistors R110 and R113. U4 is a sixteen bit multiplying D/A converter that converts a voltage level to a current. The current provided by the D/A converter is converted to a variable output voltage through the use of amplifiers U13-A and U13-B and resistors R110 and R113. Common shared resistor $R_1$ is connected to a selector switch, illustrated as a pair of switches (U6-A, U6B), that alternately connect the shared resistor $R_1$ to upstream and downstream drive signals (e.g., the drive voltage signal at the emitters of Q1 and Q2, hereinafter referred to as "the drive voltage"). The capacitor C107 is used to eliminate a narrow voltage spike when switching between upstream and downstream sources of the drive signals.

In contrast to each of the previously described embodiments of FIGS. 5–8, each of the upstream and downstream circuits of FIG. 9B also includes its own portion of the reference leg. For the upstream circuit, this portion of the reference leg (denoted $R_{2U}$ in FIG. 9A) includes resistors R166, R139, and R27, and for the downstream circuit, this portion of the reference leg (denoted $R_{2D}$ in FIG. 9A) includes R127, R136, and R114. Each of these reference leg portions is switchably connected to the common shared resistor $R_1$ by a respective sample-and-hold circuit (U32-A, R155, C111 ($C_{U1}$), and U53B upstream; and U32-B, R156, C112 ($C_{D1}$), and U50-B downstream). As in the previous embodiments, during the time interval in which the reference leg is not connected to the upstream circuit (i.e., when switches $1_A$, $1_B$ are open), the hold capacitor $C_{U1}$ (C111) maintains the voltage level at the non-inverting input of the first amplifier $U_1$. Similarly, during the time interval in which the reference leg is not connected to the downstream circuit (i.e., when switches $2_A$ and $2_B$ are open), the hold capacitor $C_{D1}$ maintains the voltage level at the non-inverting input terminal of the second amplifier $U_2$.

Recalling that each of the upstream and downstream sensor coils $R_U$ and $R_D$ are one leg of a bridge circuit, the sensor circuit of FIG. 9B operates in the following manner. The associated upstream and downstream driver amplifier ($U_1$, $U_2$) controls the resistance of its associated sensor coil $R_U$ and $R_D$ (and thus its temperature) by changing the drive voltage to the bridge. Increasing the drive voltage increases the current through the sensor coil, causing the sensor coil to warm up. Each bridge includes a reference leg (the series combination of $R_1$ and $R_{2U}$, or the series combination of $R_1$ and $R_{2D}$) that provides some temperature-dependent division ratio, and a sensor leg consisting of the sensor coil plus lead Rc and a series resistor Rs (i.e., $R_{UR}$ or $R_{DR}$). For the upstream circuit 10, the sensor leg consists of the upstream coil $R_U$ plus its lead and the resistor $R_{UR}$; for the downstream circuit, the sensor leg consists of the downstream coil $R_D$ plus its lead and the resistor $R_{DR}$. The sensor leg has a division ratio of Rc/(Rc+Rs) and the drive amplifier continually servos, attempting to match that division ratio to the division ratio of the reference leg formed by the series combination of $R_1$ and $R_{2U}$, or the series combination of $R_1$ and $R_{2D}$. The D/A converter circuit (U4, U13-A, U13-B, C109, R110, and R113) feeds a programmable fraction of each side's drive voltage to that side's sample-and-hold circuit (U32-A, R155, C111, and U53B upstream; U32-B, R156, C112, and U50-B downstream).

Assuming an ideal circuit, with resistor values as shown on FIG. 9B and ideal amplifiers, etc., when the D/A converter is set to 0, the voltage at the output of U13-B is 0. Accordingly, both sample-and-hold circuits produce 0V at their outputs (U53-B upstream, U50-B downstream). The non-inverting input (+) of each drive amplifier ($U_1$, $U_2$) sees 0.77032 times the corresponding drive voltage, and servos to set the sensor coil+lead resistance to 3.3539 times the corresponding Rs. When the D/A converter is set to 1, the voltage at the output of each sample-and-hold circuit is equal to the corresponding drive voltage. The non-inverting (+) input of each drive amplifier ($U_1$, $U_2$) sees 0.83398 times the corresponding drive voltage, and servos to set the sensor coil+lead resistance to 5.0235 times the corresponding Rs. Intermediate D/A settings provide intermediate sensor coil+lead resistances linearly proportional to the D/A setting.

It should be appreciated that sensor drive circuit of FIG. 9B provides a number of advantages over conventional sensor drive circuits. For example, when the drive voltage changes, the voltage at the non-inverting (+) input of the drive amplifier ($U_1$, $U_2$) sees the majority of the ultimate change immediately. For a D/A setting of 0, it sees the entire change immediately, and for a D/A setting of 1.0, it sees ~92% (0.77032/0.83398) of the total change immediately. The remaining 8% shows up over the next few hundred microseconds as the change propagates through the sample and hold circuits. Further, because the non-inverting input of the drive amplifier ($U_1$, $U_2$) sees changes in the drive voltage almost immediately, this permits the time constant to be raised in each of the sample and hold circuits without negatively impacting response time. In current implementations, the time constants of the sample and hold circuits have been increased to about 40 us, but it is believed that these values may be increased further. It should be appreciated that by increasing the time constant in the sample and hold circuits, high-frequency noise in the reference leg is prevented from strongly affecting the sample-and-hold circuits. This, in turn, drastically reduces the noise level in the resulting flow signal formed from the signals $V_U$ and $V_D$. Additionally, any residual noise left on the hold capacitor (i.e., $C_{U1}$ and $C_{D1}$) when the sample switch (i.e., switch $1_B$ and $2_B$) opens no longer strongly affects the voltage at the non-inverting (+) input to the drive amplifier. Specifically, with the component values shown in FIG. 9B, a 1 mV error on the hold capacitor turns into less than 64 uV error at the drive amplifier's non-inverting (+) input. This also helps substantially reduce the noise level in the resulting flow signal.

In initial testing of an exemplary implementation of the embodiment of FIG. 9B, compensated rise times of approximately 60 ms (measured from 2% to 98% on the rising edge of a fluid pulse) were repeatedly obtained, with no excess driver delay. Moreover, when implementations of the embodiment depicted in FIG. 9B were incorporated into a mass flow controller, settling times of 100 to 130 ms within 2% of the desired final value were obtained. It should be appreciated that the above results correspond to a settling time that approximately one eighth that of conventional mass flow controllers.

Referring back to the embodiment depicted in FIG. 9B, this embodiment includes several components that have not been previously described in detail. For example, resistors R159 and R160 are provided to limit transistor base current in output transistor Q1 and Q2 during start-up and over-flow conditions, when the output of the driver amplifiers ($U_1$, $U_2$) exceeds the sensor supply voltage (at the collectors of Q1 and Q2) by a substantial amount. Back to back diodes CR14 and CR15 prevent damage to the base-emitter junctions of Q1 and Q2 if the outputs of the drive amplifier U53-A and U50-A ($U_1$, $U_2$) go to the negative supply rail for any reason. Capacitors C146 and C147 are not used at present but may be used to implement future changes. Resistors R153 and R154 provide a small amount of sensor current at start-up, to ensure that amplifier offsets don't lead to the drive amplifiers trying to drive to a negative voltage. U33 and U34 convert a single pulse train (PWM_FLOW) into properly-phased signals USelect, USample, and DSample used to drive switches $1_A$ and $2_A$ and $1_B$ and $2_B$ (U6 and U32).

Resistors R140 and R141, and capacitors C124 and C125 are used to provide a fast response under certain circumstances. In particular, in early prototypes wherein resistors R27 and R114 were connected directly to ground, the circuit was difficult to stabilize, requiring very low AC gain in the driver compensation circuits (C71, C106, R22 and R20 upstream; and C105, C108, R57 and R21 downstream). Using high AC gain (R27/R20, R114/R21) produced oscillation with both driver amplifiers slamming rail-to-rail 180 degrees out of phase. Adding resistors R140 and R141, and capacitors C124 and C125 prevents the entire change in drive voltage from showing up at the drive amplifier non-inverting (+) input immediately. With the values shown, and the D/A set to 0, approximately 98.5% of the ultimate change occurs immediately, with the remaining 1.5% arriving with a time constant of ~500 us. This very slight lag in the non-inverting (+) input signal allows much higher AC gain in the drive amplifier, without making the driver unstable, thus allowing much faster response to flow changes.

It should of course be appreciated that the specific component values shown in FIG. 9B are specific to the desired operational characteristics of the mass flow sensor, and the range of conditions under which it is intended to operate. Thus, for sensors designed for different rates of flow and/or different operating conditions, it should be appreciated that the component values shown in FIG. 9B may be adjusted accordingly. It should also be appreciated that other changes to the implementation shown in FIG. 9B may also be readily envisioned. For example, for lower cost implementations, the multiplying D/A converter circuit of FIG. 9B (including U4, U13A, U13-B, C109, and resistors R110 and R113) may be replaced with a D/A converter circuit similar to that of FIG. 7, in which pulse width modulated control signals are used to vary the output voltage provided by the voltage divider.

In each of the embodiments of FIGS. 5–9B described above, although the ratio of $R_{UR}$ to $R_{DR}$ should be stable and the resistance of $R_{UR}$ and $R_{DR}$ preferably have the same value, it is not required that they be identically matched. Accordingly, each of the embodiments described with respect to FIGS. 5–9B above dispense with the need to closely match component values and characteristics as required by the circuits of FIGS. 2–4.

According to another aspect of the present invention, an amplifier circuit is provided for amplifying first and second signals provided by a sensor. The amplifier circuit provides an output signal having a range that is symmetric independent of the orientation of the sensor. Advantageously, this aspect of the present invention may be used with each of the embodiments described with respect to FIGS. 5–9 above.

Referring back to FIGS. 5–9, it should be appreciated that although the upstream and downstream coils $R_U$ and $R_D$ are similar in construction and electrical and thermal properties, operation of the sensor circuit may vary dependent upon the direction of flow. That is, depending on the specific combination of upstream and downstream voltage levels ($V_u$, $V_d$) that are used to detect flow, the sensor driver may perform very differently when the direction of flow is reversed and the "upstream" coil is used as the "downstream" coil and vice versa. For example, where the flow signal indicative of the rate of flow of fluid through the mass flow sensor is calculated based upon the equation:

$$\text{Flow}=K^*(Vu-Vd)/Vd; \qquad (1)$$

the range of the flow signal may vary dependent upon which of the coils $R_U$ and $R_D$ is used as the upstream coil, and which is used as the downstream coil. Although this flow signal is independent (to a first approximation) of ambient temperature (ignoring temperature-dependent fluid and sensor material thermal properties), the power supplied to the upstream and downstream coils varies as a function of flow. As a result, when the mass flow rate of the fluid is calculated based upon equation 1, the resulting flow signal is highly asymmetric, having a linear range that is substantially larger in one direction (e.g., when the flow is from the upstream coil to the downstream coil) than the other.

However, according to a further aspect of the present invention, rather than calculating the mass flow rate of the fluid based upon equation 1, the flow rate may be instead be calculated as:

$$\text{Flow}=K^*(Vu-Vd)/(Vu+Vd). \qquad (2)$$

The above definition of the flow rate of fluid is also (ignoring temperature-dependent fluid and sensor material thermal properties) independent of temperature. However, because (Vu−Vd) and (Vu+Vd) are both symmetric functions of flow, the flow signal is also symmetric. This symmetry permits the sensor driver circuit to perform equally well with flow in either direction. Thus, when it is desired to use the sensor in a reversed orientation wherein the "upstream" coil ($R_U$) is oriented downstream of the "downstream" coil ($R_D$), it is not necessary to physically reverse the sensor, or to change the electronics to compensate for the reversed direction of flow. Instead, the output signal provided by the sensor circuit may simply be inverted inside the digital signal processor (not shown) that processes the output signal. Another definition of flow rate that is a symmetric function of flow is the difference between the upstream and downstream voltages, that is Vu−Vd. In certain embodiments, this latter definition of flow rate may be preferred to that set forth in equation two above, as it is independent of which coil is oriented upstream of the other, but is less susceptible to noise and provides an increased sensitivity at lower ambient temperatures.

Figure 10:
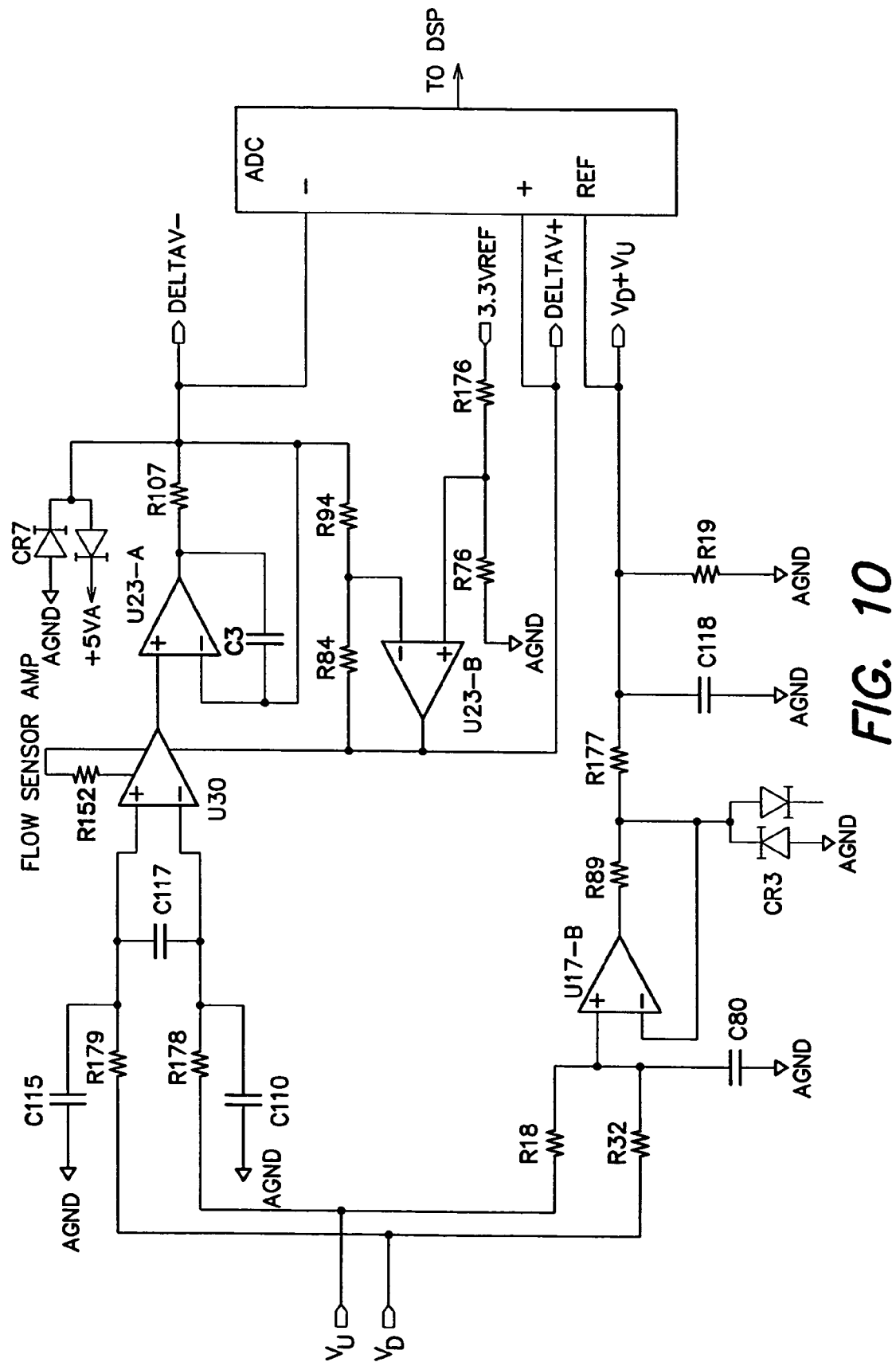
FIG. 10 is a detailed schematic diagram of a flow sensor amplifier circuit that may be used with any of the embodiments of FIGS. 5–9 to provide a flow signal having a range that is symmetric independent of the direction of flow through the mass flow sensor.

Referring to FIG. 10, an amplifier circuit that provides an output signal having a range that is symmetric independent of the orientation of the sensor is now described. The amplifier circuit includes a pair of amplifiers U30 and U17-B that each receives the output signals $V_U$, $V_D$ from the sensor circuit. The amplifier circuit provides a differential numerator signal (the difference between signals labeled "DELTAV+" and "DELTAV−") that is equal to K1*(Vu−Vd). This differential numerator signal may be applied to the differential signal inputs of an A/D converter (ADC) that converts this signal to a digital value for subsequent processing by a Digital Signal Processor (DSP) of a mass flow controller (not shown). The amplifier circuit also provides a single-ended denominator signal (labeled "VD+VU") that is equal to K2*(Vu+Vd) and which may be applied to a single-ended reference input of the A/D converter (ADC). The output of the A/D converter thus provides a digital output signal that is equal to K*(Vu−Vd)/(Vu+Vd) that may be further processed by the DSP of the mass flow controller.

The amplifier circuit of FIG. 10 may be used with any of the embodiments of the sensor circuits described above with respect to FIGS. 5–9, as each of these circuits is capable of providing sensor output signals $V_U$ and $V_D$ that represent the voltage across the upstream and downstream coils. For example, in FIG. 7, the lower right hand portion of the circuit denoted "Flow Sensor Amp" may be replaced with the amplifier circuit depicted in FIG. 10 to provide a flow signal having a range that is symmetric independent of the orientation of the sensor. Moreover, it should be appreciated that that other amplifier circuits may be used that differ from the implementation shown in FIG. 10, as the present invention is not so limited. Indeed, as long as the output of the amplifier circuit provides signals that are indicative of the difference in voltage (or current) provided to the upstream and downstream coils, and some combination of these signals that is independent of the direction of the flow of fluid through the sensor is used to detect their difference, the range of the flow signal will be symmetric independent of the orientation of the sensor. Where symmetry in the flow signal independent of sensor orientation is not required, various combinations of the sensor output signals $V_U$ and $V_D$ may be used, including ($V_U-V_D$)/$V_U$ and ($V_U-V_D$)/$V_D$.

According to a further aspect of the present invention, a variable output power supply is provided that is capable of regulating the amount of power used by a sensor circuit. According to one embodiment in which the variable output power supply is used with a mass flow sensor circuit, the variable output power supply is capable of providing an output that varies in response to a detected flow rate, such that more power is provided to the mass flow sensor circuit at high flow rates than at low flow rates. It should be appreciated in conventional mass flow sensor circuits, as much as 50% of the power provided to the mass flow sensor is wasted at low flow rates. According to another embodiment, the variable output power supply is capable of preventing the amount of power supplied by the variable output power supply from increasing excessively at very high flow rates, and for preventing phase reversal and potential latch-up in control systems associated with the mass flow sensor circuit. Advantageously, both of these aspects may be incorporated into a single variable output power supply. Such an embodiment is now described with respect to FIG. 11.

The variable output power supply 1100 includes a partially isolated switching power supply 1110 that provides a variable output voltage, controlled by a control circuit 1120 (denoted "7 V Control"). The positive output of the partially isolated switching power supply 1110 (the signal labeled "+7V") provides power to both sensor drive circuit transistors (i.e., transistors Q1 and Q2 in FIGS. 7, 8, and 9B). Return current from the sensor flows back to the partially isolated switching power supply 1110 through the "CABLE_SENSE" line (pin 3 on the sensor in FIGS. 8 and 9B). A separate lead to the sensor common point (pin 9 of the sensor in FIGS. 8 and 9B) provides a ground reference to the variable output power supply 1100.

The variable output power supply 1100 provides a voltage on the "+7V" line that is 1V greater than the greatest sensor drive voltage (defined previously above as the voltage at the emitter of either drive transistor Q1, Q2, and not the upstream or downstream sensor coil voltage $V_u$ or $V_d$). This provides a minimum 1V difference between the collector and the emitter (Vce) on both drive transistors (Q1 and Q2 in FIGS. 7,8, and 9B) that provides sufficient drive current to prevent saturation of either transistor, but without wasting a lot of power in the drive transistors.

Ignoring for a moment the operation of U8-A and the right half of dual diode CR6, dual diode CR5 and resistor R60 produce a voltage (at pin 3 of CR5) of roughly one diode drop below the highest "drive voltage." The left half of dual diode CR6 and resistor R59 translate this back up one diode drop, to produce a voltage at pin 3 of CR6 that is roughly equal to the highest "drive voltage." Amplifier U8-B and its associated passive components then translate this voltage to provide an output voltage (on the "+7V" line) that is one volt greater than the voltage at pin 3 of CR6.

It should be appreciated that the variable output power supply thus provides an output voltage that is just slightly greater than that required for proper operation of the sensor circuit, raising and lowering the supply voltage provided to the sensor circuit as needed in response to the actual power consumption of the sensor driver circuit. It should also be appreciated that this aspect of the present invention is equally applicable to each of the sensor circuits of FIGS. 7, 8, and 9B, and may be used with other sensor circuits whenever power consumption is a consideration. Indeed, where power consumption is of primary concern, and cost is not an issue, rather than providing a single output voltage to both the upstream and downstream sensor circuits, separate power supply circuits may be provided. For example, the upstream sensor driver circuit may have its own variable output power supply, and the downstream sensor driver circuit may have its own variable output power supply, each similar to that described above with respect to FIG. 11.

According to another aspect of the present invention, the variable output power supply can also be capable of preventing the amount of power supplied by the variable output power supply from increasing excessively at very high flow rates, and for preventing phase reversal and potential latch-up in control systems associated with the mass flow sensor circuit. As known to those skilled in the art, at high flow rates, the fluid flow through the sensor may be too fast to be heated properly, thereby sucking power out of both upstream and downstream sensor coils. This can have two negative effects. First, the output of the sensor circuit begins to decrease with increasing flow rates, leading to a phase reversal in most control systems and consequent latch-up if uncorrected. Second the sensor circuit power consumption increases dramatically at high flow rates, in some cases more than doubling compared to the zero-flow power consumption. Because the output of the sensor circuit decreases at very high flow rates, and because this can happen almost instantaneously, it is generally not possible to detect high-flow conditions by monitoring only the output of the sensor circuit.

According to an aspect of the present invention, a method of detecting high flow conditions in a mass flow sensor is provided. The method includes acts of calculating an expected zero flow signal at the current operating temperature, calculating a threshold based upon the expected zero flow signal, comparing an actual flow signal to the threshold, and detecting the high flow condition when the actual flow signal exceeds the threshold. This method may be implemented by a microprocessor, which advantageously may be the same microprocessor as that used in the mass flow controller that includes the mass flow sensor circuit.

According to one embodiment, the expected zero flow signal is calculated according to the sum of the upstream and downstream coil voltages ($V_u$, $V_d$) times a constant (K). That is:

$$\text{Expected Zero Flow} = K^*(V_u + V_d);$$

at zero flow and the current operating temperature. The threshold is determined by multiplying a constant (typically 1.05 to 1.10) times the Expected Zero Flow signal. Based upon a comparison of the threshold and the actual flow signal ($K^*(V_u+V_d)$), a determination is made as to whether the high flow condition exists. When it is determined that the high flow condition exists, the sensor supply voltage provided by the +7V line of the variable output power supply is prevented from increasing excessively. In addition, when it is determined that the high flow condition exists, the indicated sensor circuit output is artificially set to a high (positive or negative, depending on flow direction) value to prevent latch-up of the associated control system (typically some sort of an Integral (I), Proportional Integral (PI), Proportional Integral Differential (PID), Lead Lag (LL), Gain Lead Lag (GLL), etc. control system implemented by a microprocessor, for example, the microprocessor of a mass flow controller). The microprocessor provides a digital output signal that is converted to a pulse width modulated signal (PWM_SUPPLY in FIG. 11) to limit the supply voltage provided by the variable output power supply to the sensor circuit.

Figure 11:
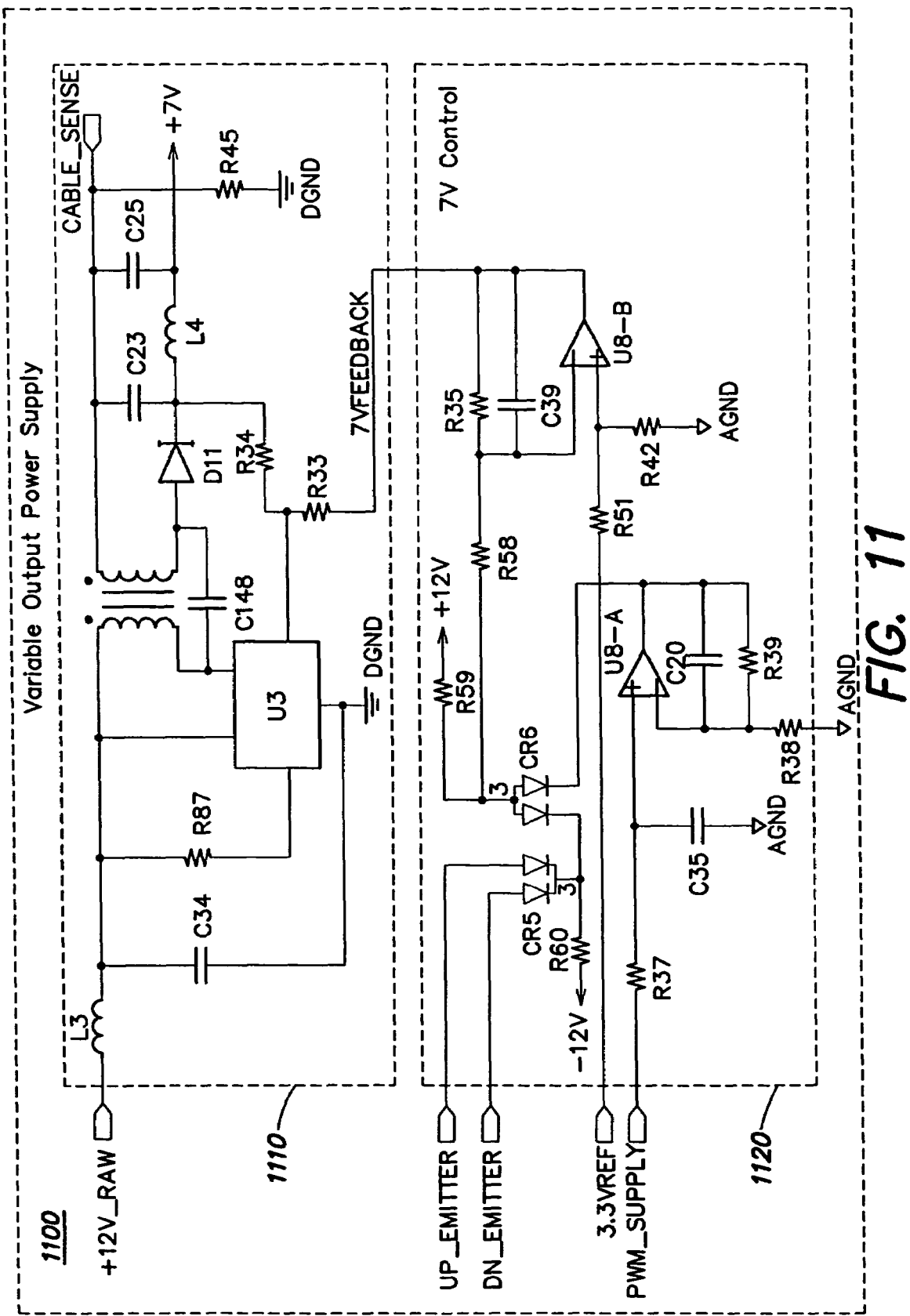
FIG. 11 is a detailed schematic diagram of a variable output power supply which may be used with any of the embodiments of FIGS. 5–9.

In the embodiment depicted in FIG. 11, a PWM (pulse-width modulator, not shown) is used to drive an RC filter that includes resistor R37 and capacitor C35. Whenever the actual flow signal (K*(Vu+Vd)) is below the threshold value, the output provided by the microprocessor is set to the maximum possible value. This output is provided to the PWM, and the output of the PWM (PWM_SUPPLY) forces the output of amplifier U8-A high, reverse-biasing the right half of dual diode CR6, and allowing the partially isolated switching power supply 1110 to operate normally. However, whenever the actual flow signal ($K^*(V_u+V_d)$) exceeds the threshold value, the output of the microprocessor is reduced proportionately. As the output drops, so does the voltage at the output of amplifier U8-A. At some point, the right half of dual diode CR6 turns on, reducing the voltage at pin 3 of CR6 below the normal value, and thus reducing the output of the partially isolated switching power supply 1110. This prevents the actual flow signal ($K^*(V_u+V_d)$) from increasing further, artificially cooling the sensor and substantially reducing the sensor driver power consumption below what it would be otherwise.

When the flow through the sensor decreases, the sensor will warm back up (since the available power being provided to the sensor is greater than that required for normal operation), and the actual flow signal ($K*(V_u+V_d)$) will eventually drop below the threshold. The microprocessor will then return the output to its normal high value, allowing the partially isolated switching power supply 1110 to resume normal operation.

It should be appreciated that although this embodiment was described with reference to a pulse width modulator, other circuit elements may be used instead. For example, rather than using a PWM as a D/A converter to convert the digital output signal of the microprocessor to an analog value, other types of D/A converters may be used as well. Moreover, it should also be appreciated that although the described embodiment limits the voltage that is provided to the sensor circuit, it could alternative limit the supply current instead. In addition, rather than using the combination of ($V_u+V_d$) as the basis for the comparison, one may alternatively monitor other signals, such as the drive voltage provided to each or both sensors, or the sensor current provided to each or both sensors, etc. In this regard, the combination of ($V_u+V_d$) is used because this signal is already available from the output of the flow sensor amplifier depicted in FIG. 10, but other combinations of signals may be used instead.

Although embodiments of the present invention have been described with respect to a mass flow sensor that is particularly well suited for semiconductor manufacturing processes, it should be appreciated that embodiments of the present invention may be used in other applications and processes. For example, embodiments of the present invention may be used in automotive applications to measure the amount of a fluid such as gasoline, or diesel fuel, or air that is delivered to a combustion chamber. Moreover, embodiments of the present invention are not limited to mass flow sensors, as the present invention may be used in other sensor and detection circuits. For example, embodiments of the present invention may be readily adapted for use in a hot-wire anemometer or any other applications in which variations in the resistance of a leg of a resistive bridge circuit is indicative of a change in a property that varies with resistance.

Having described several embodiments of the invention in detail, various modifications and improvements will readily occur to those skilled in the art. Such modifications and improvements are intended to be within the scope of the invention. In particular, although many of the embodiments described herein involve specific combinations of system elements or method acts, it should be understood that those elements and acts may be combined in other ways. Thus, elements, acts, or features discussed only in connection with one embodiment are not intended to be excluded from other embodiments. Accordingly, the foregoing description is by way of example only, and is not intended as limiting. The invention is limited only as defined by the following claims and the equivalents thereto.

What is claimed is:

1. A flow sensor to measure a flow rate of a fluid, comprising:
    a first variable resistor;
    a second variable resistor disposed downstream of the first variable resistor when a flow of the fluid is in a first direction;
    a first circuit, electrically coupled to the first variable resistor, to provide a first signal indicative of power provided to the first variable resistor;
    a second circuit, electrically coupled to the second variable resistor, to provide a second signal indicative of power provided to the second variable resistor; and
    a third circuit, to receive the first and second signals and provide an output signal indicative of a difference between the first and second signals;
    wherein a range of the output signal when the flow of fluid is in the first direction is symmetric to a range of the output signal when the flow of the fluid is in a second direction that is opposite to the first direction.

2. The flow sensor of claim 1, wherein the third circuit includes:
    a first amplifier circuit to provide a third signal indicative of the difference between the first and second signals;
    a second amplifier circuit to provide a fourth signal indicative of a sum of the first and second signals; and
    a converter circuit to receive the third signal and the fourth signal, divide the third signal by the fourth signal to provide a divided signal, and provide the divided signal as the output signal.

3. The flow sensor of claim 1, wherein the converter circuit includes an Analog to Digital converter having a differential input to receive the third signal and a reference input to receive the fourth signal.

4. A flow sensor to measure a flow rate of a fluid, comprising:
    a first variable resistor;
    a second variable resistor;
    a first circuit, electrically coupled to the first variable resistor, to provide a first signal indicative of power provided to the first variable resistor;
    a second circuit, electrically coupled to the second variable resistor, to provide a second signal indicative of power provided to the second variable resistor;
    a third circuit, to receive the first and second signals and provide an output signal indicative of a difference between the first and second signals; and
    a power supply circuit, electrically connected to at least one of the first and second circuits, to provide a variable amount of power to at least one of the first and second circuits dependent upon the flow rate of the fluid.

5. The flow sensor of claim 4, wherein the power supply circuit is electrically connected to each of the first and second circuits, to provide the variable amount of power to each of the first and second circuits dependent upon the flow rate of the fluid.

6. The flow sensor of claim 4, wherein the power supply circuit decreases the variable amount of power provided to at least one of the first and second circuits at low flow rates and increases the variable amount of power provided to at least one of the first and second circuits at high flow rates.

7. A method of detecting a high flow condition in a flow sensor, comprising acts of:
    determining an expected zero flow signal at a current operating temperature of the flow sensor;
    determining a threshold based upon the expected zero flow signal;
    determining an actual flow signal measured by the flow sensor at the current operating temperature of the flow sensor;
    comparing the actual flow signal measured by the flow sensor to the threshold; and
    determining that the high flow condition exists when the actual flow signal exceeds the threshold.

8. The method of claim 7, wherein the flow sensor includes an upstream circuit that provides a first output signal indicative of power provided to an upstream coil of the flow sensor and a downstream circuit that provides a second output signal indicative of power provided to a downstream coil of the flow sensor, wherein the act of determining the expected zero flow signal includes an act of determining a sum of the first and second output signals at a zero flow rate at the current operating temperature of the flow sensor.

9. The method of claim 8, wherein the act of determining the threshold includes an act of multiplying the expected zero flow signal by a constant.

10. The method of claim 9, wherein the act of determining the actual flow signal includes an act of determining a sum of the first and second output signals at a current flow rate at the current operating temperature of the flow sensor.

11. The method of claim 10, further comprising an act of preventing an amount of power provided to the upstream coil and the downstream coil from increasing excessively in response to the act of determining that the high flow condition exists.

12. The method of claim 11, wherein the act of preventing includes an act of regulating an amount of power provided to the upstream coil and the downstream coil.

13. The method of claim 12, wherein the act of regulating the amount of power includes an act of regulating a voltage provided to the upstream coil and the downstream coil.

14. The method of claim 13, wherein the flow sensor provides a sensor output signal that is based upon a difference between the first output signal and the second output signal, the method further comprising an act of setting the sensor output signal to a high value in response to the act of determining that the high flow condition exists.

15. The method of claim 14, wherein the high value is dependent upon a direction of a flow of fluid through the flow sensor.

16. The method of claim 7, wherein the flow sensor includes an upstream circuit that provides a first output signal indicative of power provided to an upstream coil of the flow sensor and a downstream circuit that provides a second output signal indicative of power provided to a downstream coil of the flow sensor, the method further comprising an act of preventing an amount of power provided to the upstream coil and the downstream coil from increasing excessively in response to the act of determining that the high flow condition exists.

17. The method of claim 16, wherein the flow sensor provides a sensor output signal that is based upon a difference between the first output signal and the second output signal, the method further comprising an act of setting the sensor output signal to a high value in response to the act of determining that the high flow condition exists.

18. The method of claim 17, wherein the high value is dependent upon a direction of a flow of fluid through the flow sensor.

19. The method of claim 7, wherein the flow sensor includes an upstream circuit that provides a first output signal indicative of power provided to an upstream coil of the flow sensor and a downstream circuit that provides a second output signal indicative of power provided to a downstream coil of the flow sensor, wherein the flow sensor provides a sensor output signal that is based upon a difference between the first output signal and the second output signal, the method further comprising an act of setting the sensor output signal to a high value in response to the act of determining that the high flow condition exists.

20. The method of claim 19, wherein the high value is dependent upon a direction of a flow of fluid through the flow sensor.

21. The method of claim 7, wherein the expected zero flow signal and the actual flow signal are indicative of a total amount of power provided to the flow sensor at a zero flow rate and a current flow rate, respectively, at the current operating temperature of the flow sensor.

* * * * *